United States Patent
Schanke et al.

(10) Patent No.: US 7,242,736 B2
(45) Date of Patent: Jul. 10, 2007

(54) DATA TRANSFER

(75) Inventors: Morten Schanke, Oslo (NO); Steinar Forsmo, Oslo (NO); Ali Bozkaya, Oslo (NO); Hans Rygh, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 797 days.

(21) Appl. No.: 10/438,898

(22) Filed: May 15, 2003

(65) Prior Publication Data

US 2004/0228429 A1 Nov. 18, 2004

(51) Int. Cl.
*H04L 25/00* (2006.01)

(52) U.S. Cl. .................. 375/372; 375/354; 375/371

(58) Field of Classification Search ................ 375/372, 375/371, 354
See application file for complete search history.

(56) References Cited

U.S. PATENT DOCUMENTS

| | | | |
|---|---|---|---|
| 5,563,891 A * | 10/1996 | Wang | 370/505 |
| 6,009,231 A * | 12/1999 | Aoki et al. | 386/68 |
| 6,560,299 B1 * | 5/2003 | Strolle et al. | 375/347 |
| 6,650,880 B1 * | 11/2003 | Lee et al. | 455/259 |
| 6,977,897 B1 * | 12/2005 | Nelson et al. | 370/235 |
| 2004/0199732 A1 * | 10/2004 | Kelley et al. | 711/158 |

* cited by examiner

*Primary Examiner*—Kevin Kim
(74) *Attorney, Agent, or Firm*—Park, Vaughan & Fleming, LLP

(57) ABSTRACT

A receiver for digital data is provided. The receiver comprises a ring buffer operable to store received data. The receiver also comprises a write pointer controller for the buffer, operable to control the writing of received data into the buffer, and a read pointer controller for the buffer, operable to control the reading of data from the buffer. The receiver further comprises a pointer adjustment controller operable, in response to a detection of a special data indicator, to control at least one of the write pointer controller and the read pointer controller using forward looking operable to foresee a data location within the buffer corresponding to a future read location of the buffer.

57 Claims, 17 Drawing Sheets

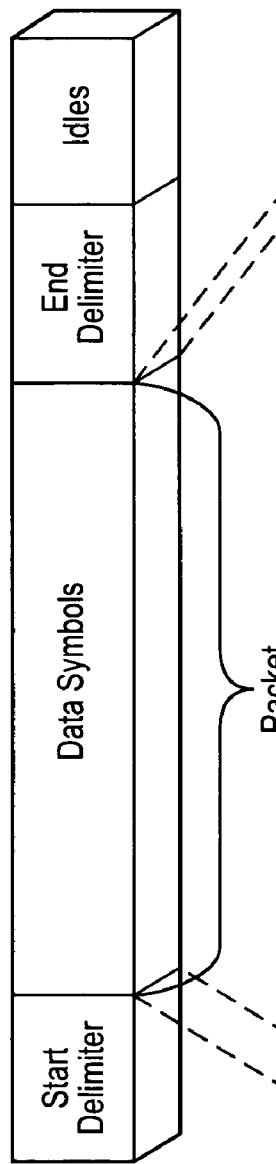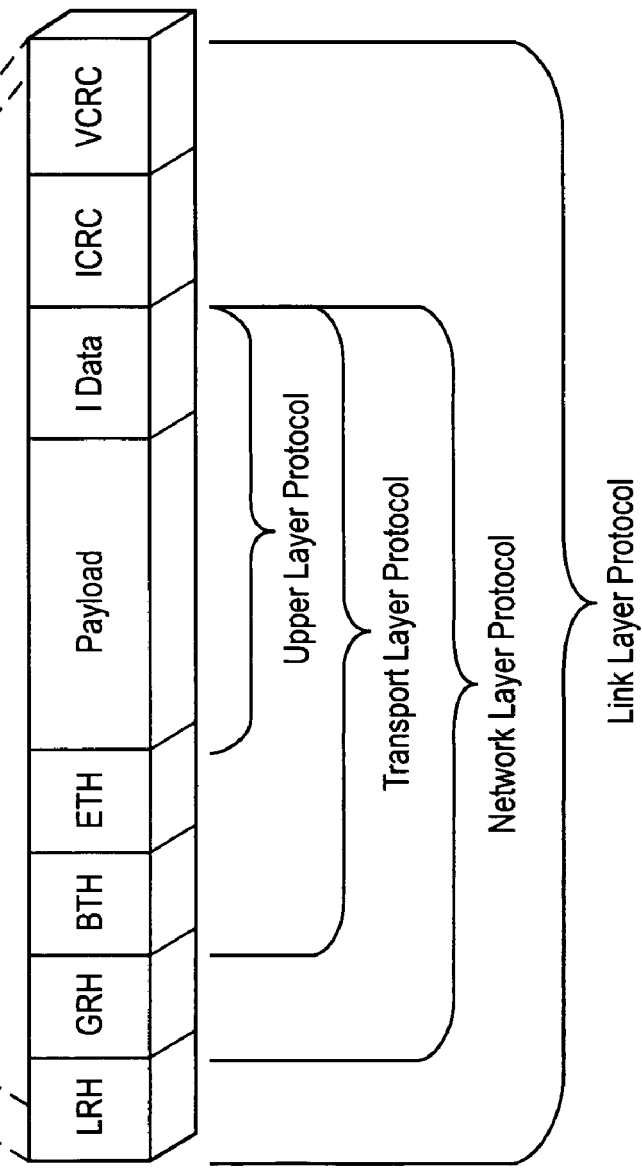

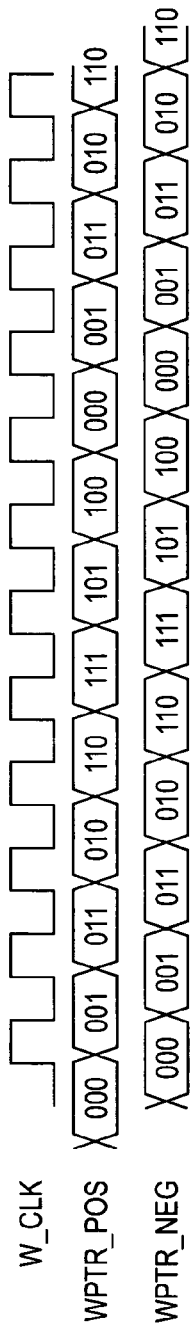
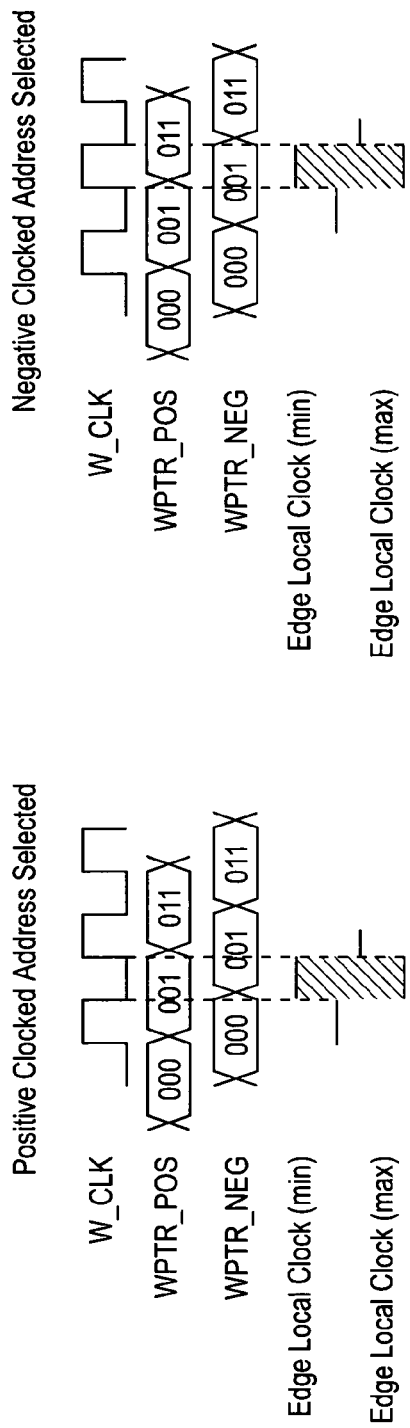
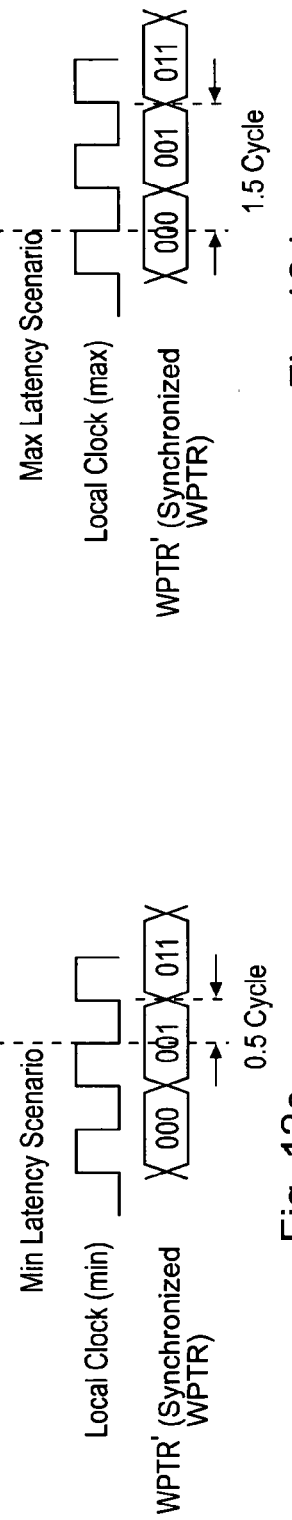
Fig. 12b
Fig. 12c
Fig. 12d

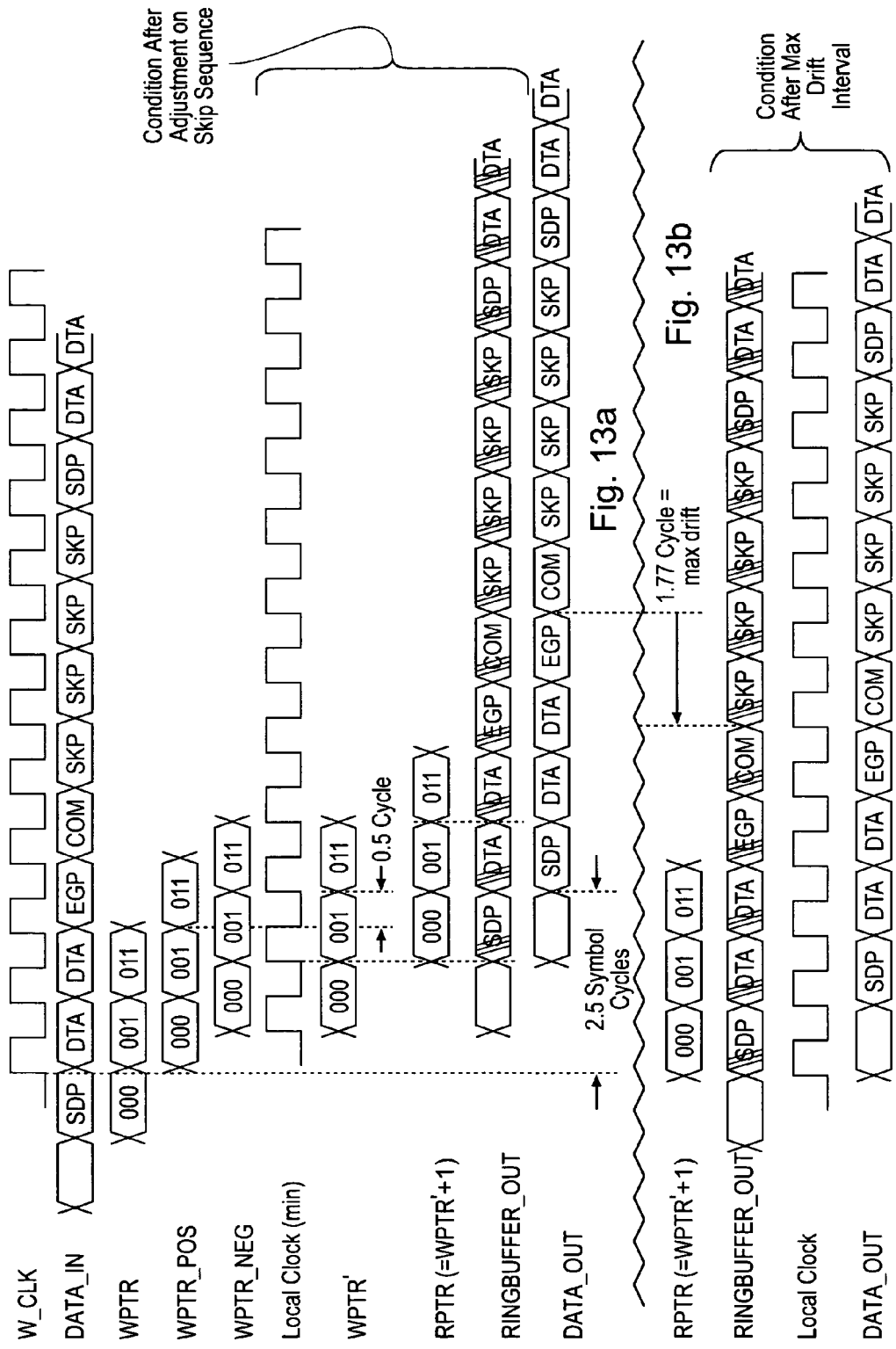

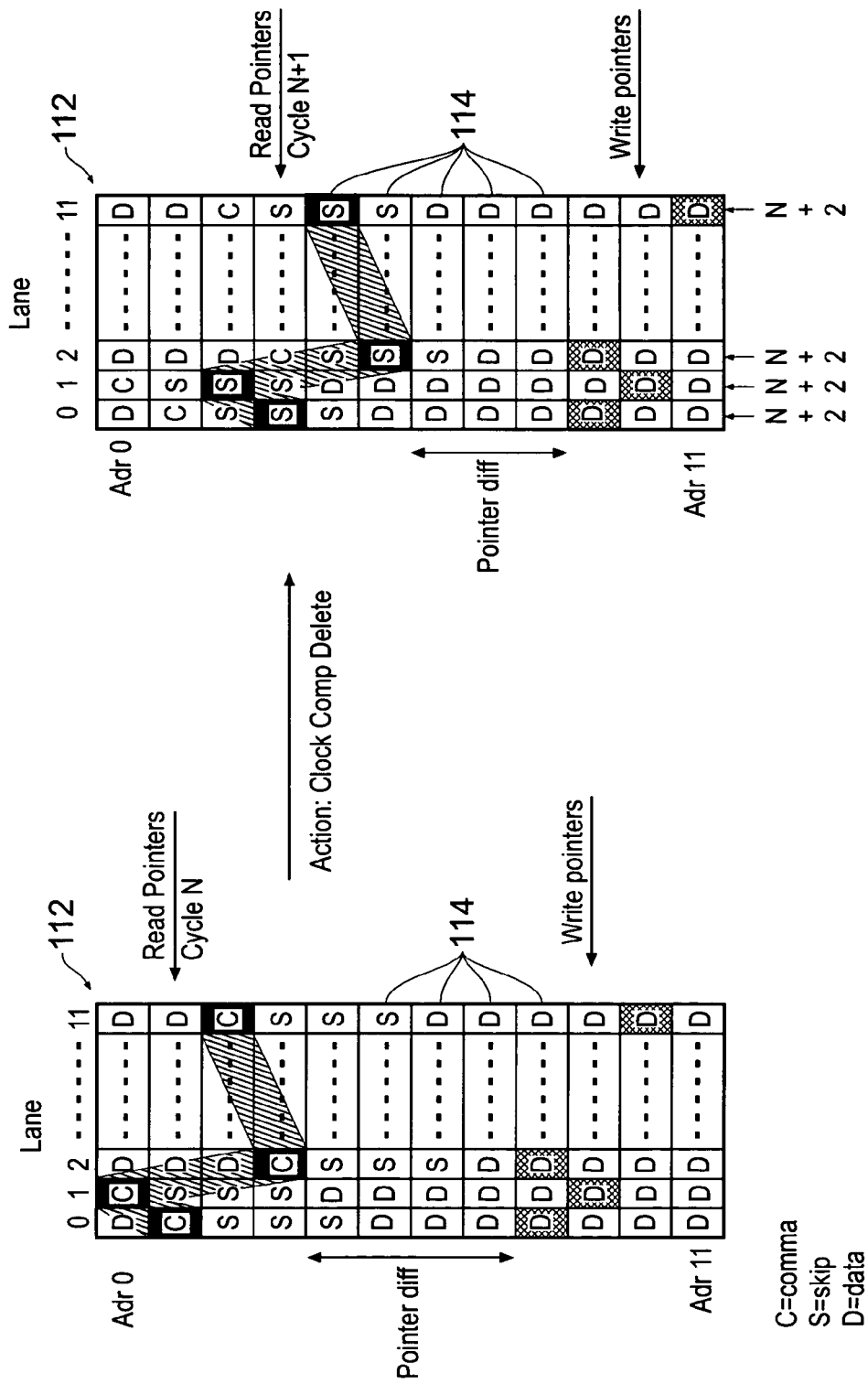

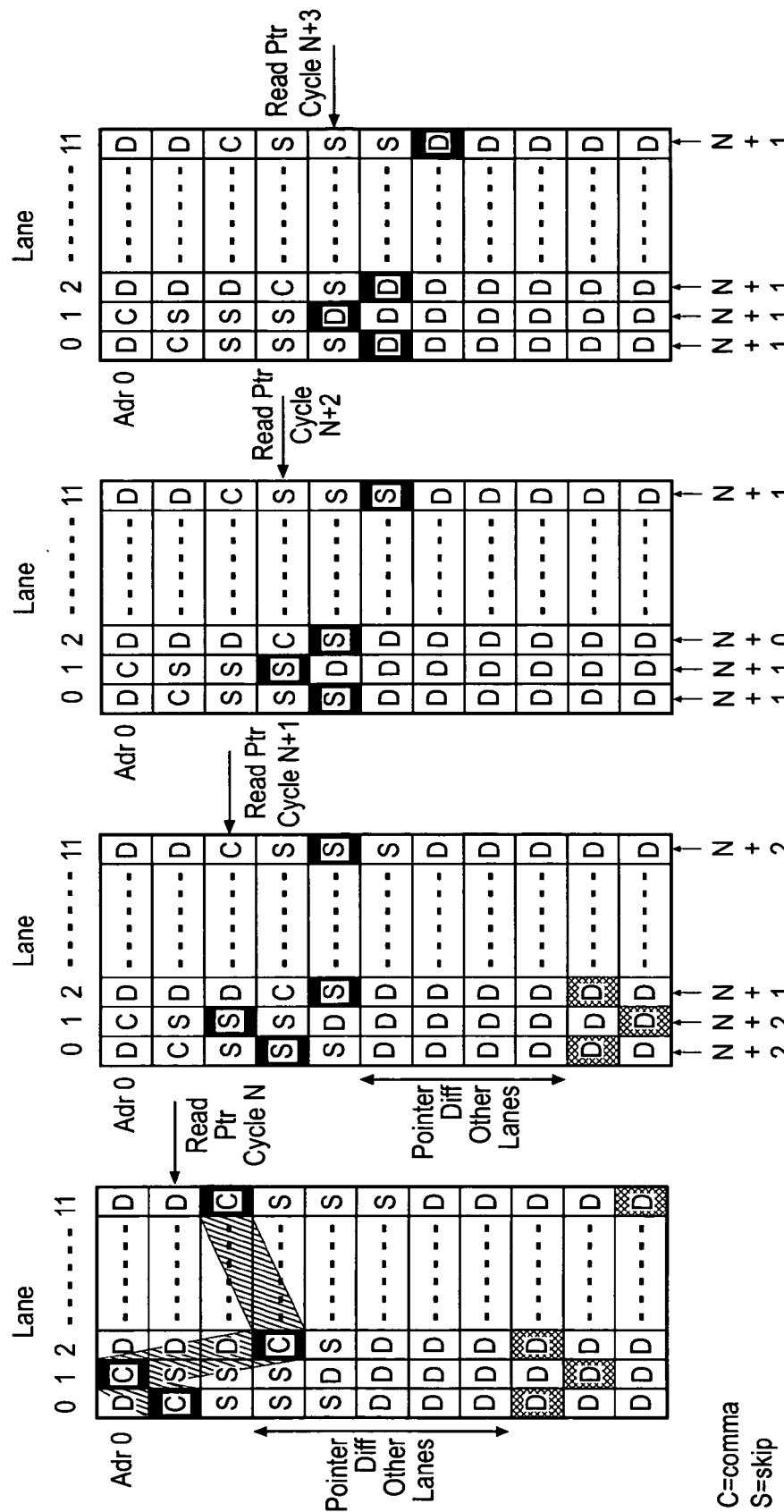

DATA TRANSFER

The present invention relates to data transfer systems, and in particular but not exclusively, to arrangements for a latency optimised deskewing process for data transfer systems.

INTRODUCTION

There are many fields in which mankind has become reliant on computers to perform valuable and sometimes essential functions. The reliance on computer systems demands that the operational efficiency of a computer system is as high as possible. One factor prejudicial to high operational efficiency of a computer system is the time taken for a given part or device of the computer system to perform a task, otherwise known as the latency of that part or device. If a computer system device has too high a latency, then the reduction in operational efficiency compared to a computer system not having that device can be substantial. For example, if a computer system is operating as a server or an exchange forming part of a telecommunications system, then a high latency device will result in a lower rate at which communications can be performed using the telecommunications system, which can result in a considerable loss of business and therefore revenue for an organisation. Computer systems are therefore arranged to have as low a latency as possible, so that the operational efficiency is made as high as possible.

Within network-type computer system links, whether internal to an individual computer system or interconnecting multiple computer systems, latency is also a problem. In particular, given that the latency of a particular physical link is fixed by the length of that link (as transmission of current or light through wires or fibres respectively takes place at a speed determined by physics rather than the system designer), latency reduction is a high priority for the transmit and receive hardware of devices communicating via the network.

In particular, it is known that in some network-type computer system links a number of transmission-related problems must be overcome. These may include a lack of synchronisation between transmitter and receiver clocks, relative drift between transmitter and receiver clocks, and/or skew that results from different physical lanes of a given link having different path lengths and transmission times (skew latency).

Existing attempts to address these problems have included omitting a receiver clock, such that the receiver operates on a clock regenerated from the received signals across the link. This approach leaves the receiver considerably less robust in a reliability of operation sense than a receiver having its own local clock. Some network standards require so-called "skip" sequences to be included at regular intervals in a data stream, such that clock drift may be corrected or mitigated by allowing extra cycles to be inserted into the received stream by the receiver. These previous approaches have had varying levels of success at addressing the problems; however, all have resulted in reducing the operational efficiency of the system due to a high latency of the circuits utilised.

SUMMARY OF THE INVENTION

The present invention has been made, at least in parts, in consideration of the above identified problems and drawbacks of conventional systems.

In particular, the present invention aims to provide a system operable to perform the three functions of clock offset compensation, lane to lane deskew and clock drift compensation together in a single merged functionality, such that latency is reduced to a minimum level.

The present invention further aims to provide a system operable to perform lane alignment by adding or deleting skip symbols to skip sequences of received data.

A first aspect of the invention provides a receiver for digital data. The receiver comprises a ring buffer operable to store received data; a write pointer controller for the buffer, operable to control the writing of received data into the buffer; and a read pointer controller for the buffer, operable to control the reading of data from the buffer. The receiver further comprises a pointer adjustment controller operable, in response to a detection of a special data indicator, to control at least one of the write pointer controller and the read pointer controller using forward looking operable to foresee a data location within the buffer corresponding to a future read location of the buffer. According to this arrangement, latency within the receiver may be reduced to a minimum level without comprising data integrity.

According to a second aspect of the invention, there is provided a method for latency optimisation in a receiver for digital data. The method comprises writing received data into a ring buffer at a current write position; reading data from the buffer at a current read position; reading data from the buffer at a future read position; and controlling at least one of a write pointer indicating the current write position and a read pointer indicating the current read position based on the data read from the buffer at the future read position, in response to detection of a special data indicator. This method advantageously provides minimisation of latency within a receiver without compromising data integrity.

Another aspect of the invention provides a receiver for digital data. The receiver comprises a ring buffer operable to store received data; a write pointer controller for the buffer operable to control the writing of received data into the buffer based on a clock signal regenerated from data received at the receiver; and a read pointer controller for the buffer operable to control the reading of data from the buffer based on a local clock signal. The receiver further comprises a clock synchroniser operable to synchronise a signal representative of the regenerated clock signal to a signal representative of the local clock signal; and a pointer adjustment controller operable to control at least one of the write pointer controller and the read pointer controller based on an output of the clock synchroniser. The receiver so provided allows optimisation of the latency of the receiver using a local clock synchronised with the clock of a received signal to provide a minimum latency.

According to a further aspect of the invention, there is provided a multi-lane receiver for digital data. The receiver comprises a ring buffer for each lane, operable to store received data; a write pointer controller for each buffer, operable to control the writing of received data into the buffer based on a clock signal regenerated from data received at the receiver; and a read pointer controller for each buffer, operable to control the reading of data from the buffer based on a local clock signal. The receiver further comprises a clock synchroniser for each buffer operable to synchronise a signal representative of the regenerated clock signal to a signal representative of the local clock signal; and a pointer adjustment controller operable to control at least one of the write pointer controller and the read pointer controller based on an output of the clock synchroniser. This arrangement provides a latency optimised receiver for a plurality of data transmission lanes, thereby providing for receipt of multiple data signals over multiple lanes in a minimum latency manner.

According to another aspect of the invention, there is provided a method for latency optimisation in a receiver for digital data. The method comprises writing received data into a ring buffer at a current write position determined on the basis of a clock signal regenerated from data received at the receiver; reading data from the buffer at a current read position determined on the basis of a local clock signal; synchronising a signal representative of the regenerated clock signal to a signal representative of the local clock signal; and controlling at least one of a write pointer indicating the current write position and a read pointer indicating the current read position based on a result of the synchronising step. This method allows a receiver to be optimised for latency using a local clock synchronised with the clock of a received signal to provide a minimum latency.

According to a further aspect of the invention, there is provided a multi-lane receiver for digital data. The receiver comprises a controller operable to control the position of a read pointer for a ring buffer for each lane in response to a detected non-alignment of data received by separate lanes of the receiver, and/or in response to a detected phase offset between a clock signal recovered from data received by a lane and a clock signal used to control the read pointer position, and/or in response to a detected phase drift between a clock signal recovered from data received by a lane and an clock signal used to control the read pointer position. This arrangement provides for an optimisation of characteristics of the receiver based on the timing of a received signal.

BRIEF DESCRIPTION OF FIGURES

Specific embodiments of the present invention will now be described by way of example only, with reference to the accompanying figures in which:

FIG. 6 shows schematically the structure of a message to be transmitted via an Infiniband™ Architecture;

FIG. 7 shows schematically the format of a packet of the message of FIG. 6;

FIGS. 12b, 12c and 12d are timing diagrams showing the operation of the clock synchroniser of FIG. 12a;

FIGS. 13a and 13b are timing diagrams showing the operation of the ring buffer of the deskew and synchronisation circuit of FIG. 11;

FIG. 18 is a schematic diagram showing the behaviour of the read and write pointers during a clock compensation delete of the same magnitude to each lane;

FIG. 20 is a schematic diagram showing the behaviour of the read and write pointers during a combined clock compensation delete of the same magnitude to each lane and a correction in response to a disaligned skip being received.

Figure 1:
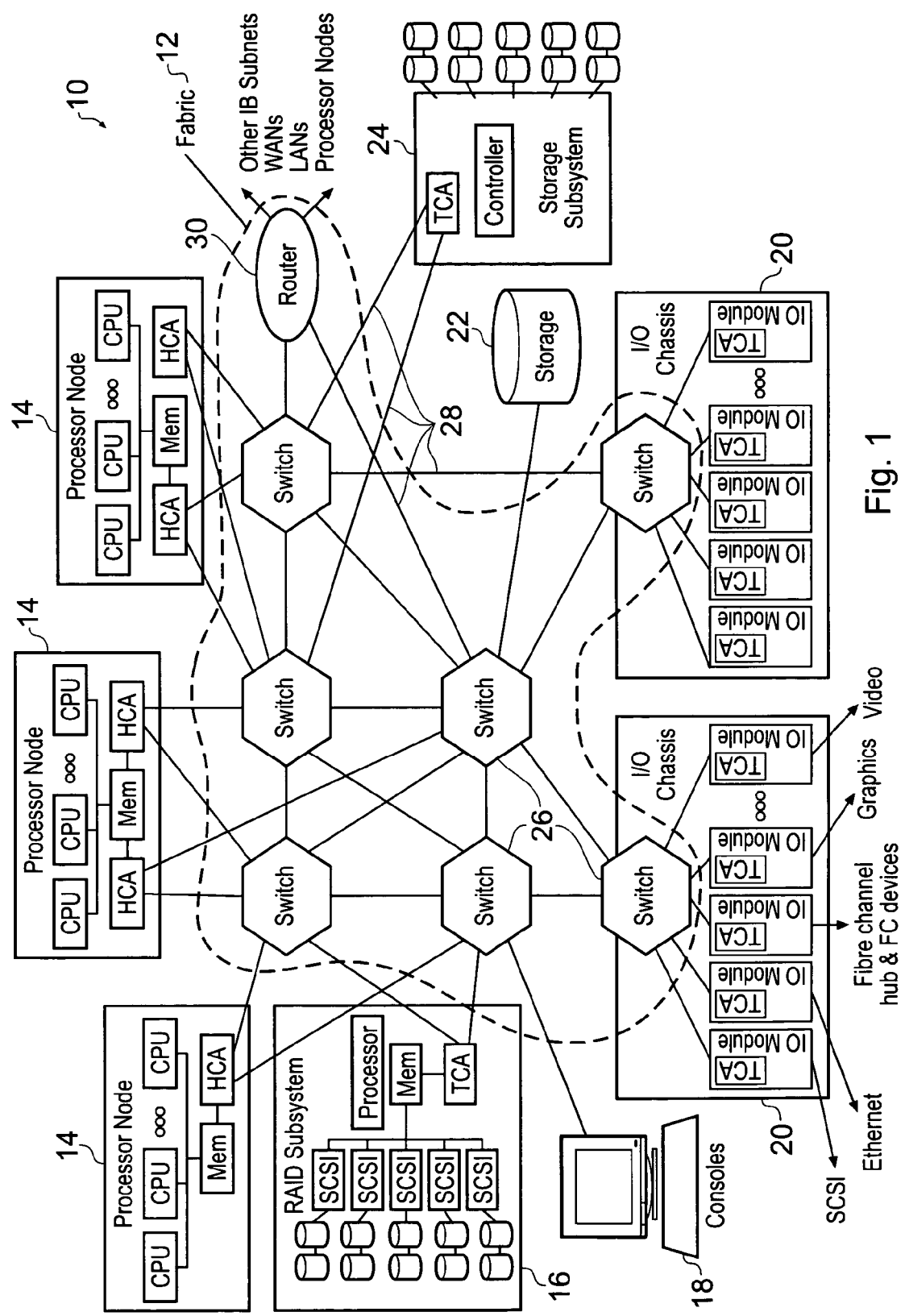
FIG. 1 is a schematic block diagram showing an example of interconnection of computing system elements via the Infiniband™ networking architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF SPECIFIC EMBODIMENTS

It should be understood that the techniques of the present invention may be implemented using a variety of technologies. For example, methods described herein may be implemented in software executing on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on or carried by a suitable computer-readable medium. Suitable computer-readable media may include volatile memory (e.g., RAM) and/or non-volatile memory (e.g., ROM, disk), carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

A particular computer networking architecture is the Infiniband™ architecture. Infiniband™ is a standard architecture defined and administered by the Infiniband™ Trade Association, which was founded by Compaq, Dell, Hewlett-Packard, IBM, Intel, Microsoft and Sun Microsystems. The Infiniband™ Architecture defines a System Area Network (SAN) for connecting multiple independent processor platforms (i.e. host processor nodes), I/O platforms and I/O devices. A full definition of the Infiniband™ Architecture may be found in the Infiniband™ Architecture Specification Volumes 1 and 2, available from the Infiniband™ Trade Association. Infiniband™ defines a standard for flexible and high speed interconnect between computing systems or parts of computing system such as processor and I/O nodes. Infiniband™ allows an order of magnitude more flexibility and scalability than conventional bus based systems through a highly hardware coupled and low latency interface, which is a key factor in multiprocessing architectures.

The Infiniband™ Architecture SAN is a communications and management infrastructure supporting both I/O and interprocessor communications for one or more computer systems. An Infiniband™ Architecture system can range from a small server with one processor and a few I/O devices to a massively parallel supercomputer installation with hundreds of processors and thousands of I/O devices.

The Infiniband™ Architecture defines a switched communications fabric allowing many devices to concurrently communicate with high bandwidth and low latency in a protected, remotely managed environment. An endnode can communicate over multiple Infiniband™ Architecture ports and can utilise multiple paths through the Infiniband™ Architecture fabric. A multiplicity of Infiniband™ Architecture ports and paths through the network are provided for both fault tolerance and increased data transfer bandwidth.

Infiniband™ Architecture hardware off-loads from the CPU much of the I/O communications operation. This allows multiple concurrent communications without the traditional overhead associated with communicating protocols. The Infiniband™ Architecture SAN provides its I/O and interprocessor communications clients zero processor-copy data transfers, with no kernel involvement, and uses hardware to provide highly reliable, fault tolerant communications.

An example of an Infiniband™ Architecture System Area Network is shown in FIG. 1. As can be seen from FIG. 1, a System Area Network 10 comprises an Infiniband™ Architecture fabric (or Subnet) 12 made up of cascaded switches and routers. The fabric 12 provides links between a number of processor nodes 14 and other nodes including a RAID Subsystem 16, consoles 18, I/O Chassis 20, Storage 22 and a Storage Subsystem 24. The fabric 12 is made up of a plurality of switches 26 having interconnections 28 providing data connections therebetween and between the nodes attached to the fabric 12. Also include in the fabric 12 is a router 30 for providing connections to and from other networks, which may be other Infiniband™ Architecture subnets, non-Infiniband™ Architecture LANs and WANs and/or processor nodes. I/O units connected via the fabric 12 may range in complexity from single ASIC devices such as a SCSI (small computer systems interface) or LAN adapter to large memory-rich RAID subsystems that rival a processor node in complexity. Collectively, the processor nodes 14, raid subsystems 16, consoles 18, I/O Chassis 20, Storage 22 and Storage Subsystems 24 are known as endnodes 32.

Each endnode 32 has therein a Channel Adapter, which may be a Host Channel Adapter (HCA) or a Target Channel Adapter (TCA). Generally, Host Channel Adapters are to be found in processor nodes 14, and Target Channel Adapters are to be found in I/O Nodes 16, 18, 20, 22 and 24. Host Channel Adapters are configured to issue requests across the fabric 12, and Target Channel Adapters are configured to respond to such requests, for example by supplying requested data or storing supplied data. Each Channel Adapter uses a queuing system based on Queue Pairs, one queue for send operations and one for receive operations. Each Queue Pair may therefore be considered to provide a virtual communication port of a Channel Adapter. Each Channel Adapter may have up to $2^{24}$ Queue Pairs, which may be assigned individually or in combination to handle operations affecting different parts (or consumers) of the endnode 32. For example, a processor node 16 may comprise a plurality of processors and each processor may have one or more individual Queue Pairs assigned to handle requests and responses flowing to and from that processor of that processor node 16 via the fabric 12. Alternatively, or in addition, a processor of a given processor node 16 may be running more than one process and each process may have one or more Queue Pairs assigned to handle requests and responses flowing to and from that process via the fabric 12.

In the embodiment of FIG. 1, the interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
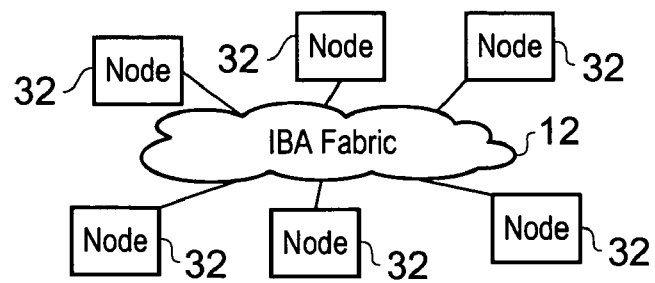
FIG. 2 is a schematic block diagram of a simplified arrangement of an Infiniband™ Architecture system.
Figure 3:
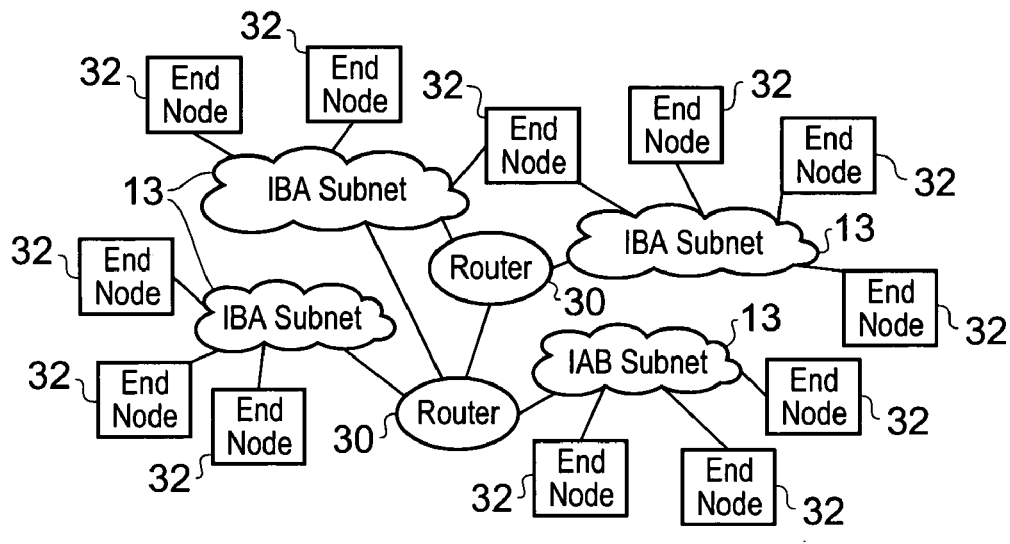
FIG. 3 is a schematic block diagram of another simplified arrangement of an Infiniband™ Architecture system.
Figure 4:
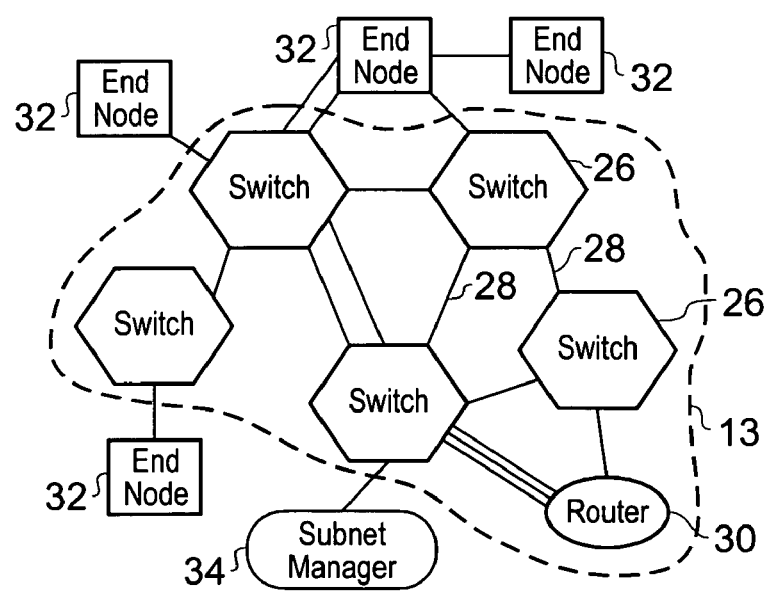
FIG. 4 is a schematic block diagram of a further simplified arrangement of an Infiniband™ Architecture system.

Examples of possible Infiniband™ Architecture topologies are shown in FIGS. 2, 3 and 4. FIG. 2 shows a high level simplified topology example where a number of endnodes 32 are interconnected by the fabric 12. An Infiniband™ Architecture network may be subdivided into subnets 13 interconnected by routers 30, as illustrated in FIG. 3. Any particular endnode 32 may be attached to a single subnet 13 or to multiple subnets 13. Shown in FIG. 4 is an example of the structure of a subnet 13. The subnet 13 of FIG. 4 comprises endnodes 32, switches 26, routers 30 and subnet managers 34 interconnected by links 28. Each endnode 32 may attach to a single switch 26, multiple switches 26 and/or directly with each other. In the case of direct connection between endnodes 32, the two or more directly linked endnodes effectively form an independent subnet with no connectivity to the remainder of the devices attached to the main subnet and one of the interconnected endnodes functions as the subnet manager for that link.

Figure 5:
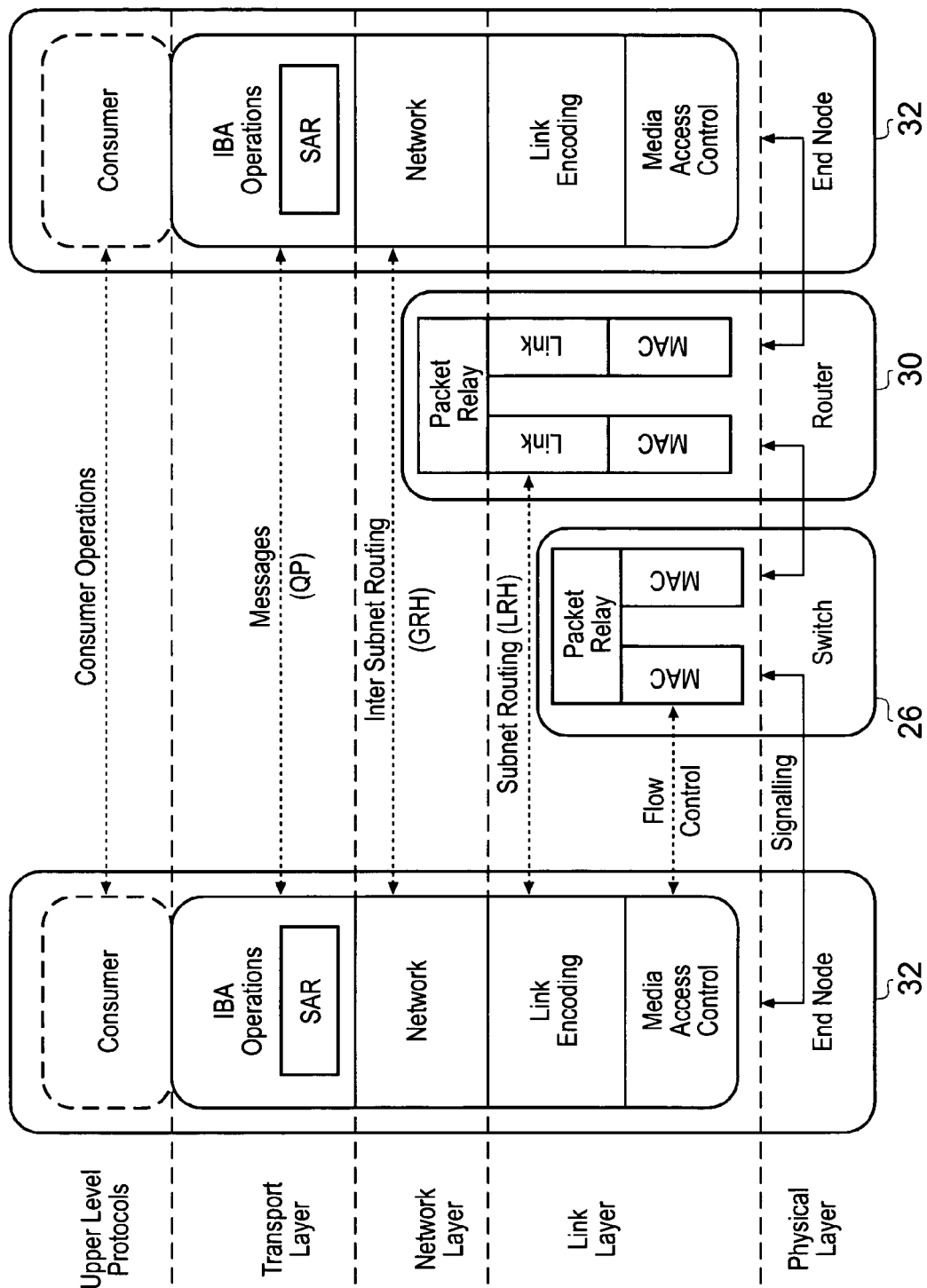
FIG. 5 shows a schematic illustration of the architecture layers of an Infiniband™ Architecture system.

Referring now to FIG. 5, there is shown an illustration of the architecture layers of an Infiniband™ Architecture system. Starting with the physical layer, this illustration specifies how bits are placed onto the interconnections 28 and defines the symbols used for framing (e.g., start of packet, end of packet), data symbols and fill between packets (e.g., idles). It also specifies the signalling protocol as to what constitutes a validly formed packet (e.g., symbol encoding, proper alignment of framing symbols, no invalid or non-data symbols between start and end delimiter, no disparity errors, synchronisation method). The signalling protocol used by the Infiniband™ Architecture utilises a differential signal. The physical (or wireless) interconnects 28 between nodes of an Infiniband™ Architecture network are normally provided by electrical signal carries such as copper cables or optical signal carriers such as optical fibres. As discussed above, the maximum data rate of an interconnect is limited by the bandwidth of the selected channel. The physical layer also includes deskewing circuitry for compensating for skew latency in the channels.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

The data packet format is illustrated in FIG. 7. Packets may be one of two types, IBA (Infiniband™ Architecture) Packets or RAW (non-Infiniband™ Architecture) Packets. IBA Packets have IBA defined transport headers, are routed on Infiniband™ Architecture fabrics 12, and use native Infiniband™ Architecture transport facilities. Raw Packets may be routed on IBA fabrics but do not contain Infiniband™ Architecture transport headers. From the Infiniband™ point of view, these packets contain only Infiniband™ routing headers, payload and CRC. Infiniband™ Architecture does not define the processing of these packets above the link and network layers. These packets can be used to support non-Infiniband™ Architecture transport protocols (e.g., TCP/IP, IPX/SPX, NetBEUI) over an Infiniband™ fabric.

The Link Layer describes the packet format and protocols for packet operation, such as flow control and how packets are routed within a subnet between the source and the destination. Packets may be data packets that convey data between endnodes and which consist of a number of different headers which may or may not be present. Alternatively, packets may be Link Management Packets that are used to train and maintain link operation. These packets are used to negotiate operational parameters between the ports at each end of the link such as bit rate, etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sourcing data packets. The receiver is the consumer of the data packets. Each end of the link has a transmitter and a receiver. The Infiniband™ Architecture utilises an "absolute" credit-based flow control scheme; that is to say that Infiniband™ Architecture receivers provide a "credit limit". A credit limit is an indication of the total amount of data that the transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The Infiniband™ Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the Link Layer adds a Local Route Header (LRH) to the front of the packet and adds Invariant and Variant Cyclic Redundancy Checks (ICRC and VCRC) to the end of the packet. The Local Route Header is always present, and identifies the local source and local destination where switches 26 will route the packet. The Invariant Cyclic Redundancy Check covers all fields within the packet that do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The Network Layer, which is present only within routers 30 and endnodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13, the routers 30 modify the content of the Global Route Header and replace the Local Route Header, but the source and destination port identities are not changed and are protected by the Invariant Cyclic Redundancy Check. Thus the Network and Link Layers operate together to deliver a packet to the desired destination.

The Transport Layer, which is present only within endnodes 32, delivers the packet to the proper Queue Pair within the Channel Adapter of the destination endnode 32 and instructs that Queue Pair as to how the packet's data should be processed. The transport layer also has responsibility for segmenting an operation into multiple packets when the message's data payload is greater than the maximum payload carryable by a single packet. The receiving Queue Pair then reassembles the data from the multiple packets at the destination endnode 32. The transport layer adds up to two headers to the packet. The Base Transport Header (BTH) is present in all IBA Packets but not in RAW Packets. It identifies the destination Queue Pair and indicates an operation code and packet sequence number, and specifies the operation (e.g., Send, Read, Write). A number of Extended Transport Headers (ETH) may be present, conditional on the class of service and operation code.

The Packet Sequence Number is initialised for a given Queue Pair as part of the communications establishment process, and increments each time that Queue Pair creates a new packet. The receiving Queue Pair tracks the received Packet Sequence Number to determine whether any packets have been lost. For reliable service, the receiver endnode 32 may transmit an acknowledge signal back to the originator endnode to indicate whether all packets have been received successfully.

The Upper Layer Protocols are completely software-based and may comprise any number of protocols used by various user consumers. The payload is the data carried by the packet and I Data comprises handling data associated with a work activity to be performed on the payload. Also present in the Upper Layer protocols are Subnet Management and Subnet Services protocols. These protocols provide management structure, including management messages for management of the subnet 13. Each subnet 13 requires only a single Subnet Manager application 34, which may be present in a dedicated node (as illustrated in FIG. 4) or may reside in another node, including a switch 26 or a router 30 as well as an endnode 32.

Figure 8:
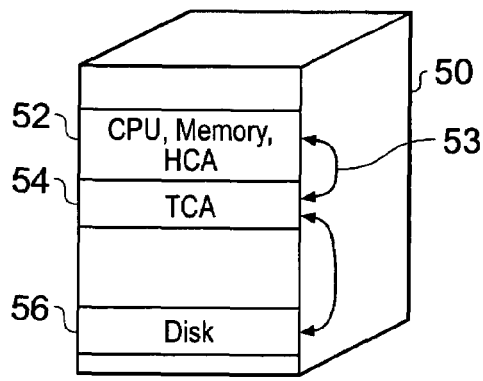
FIG. 8 is a schematic block diagram showing an arrangement where the Infiniband™ Architecture is used to interconnect components within a computer system.
Figure 9:
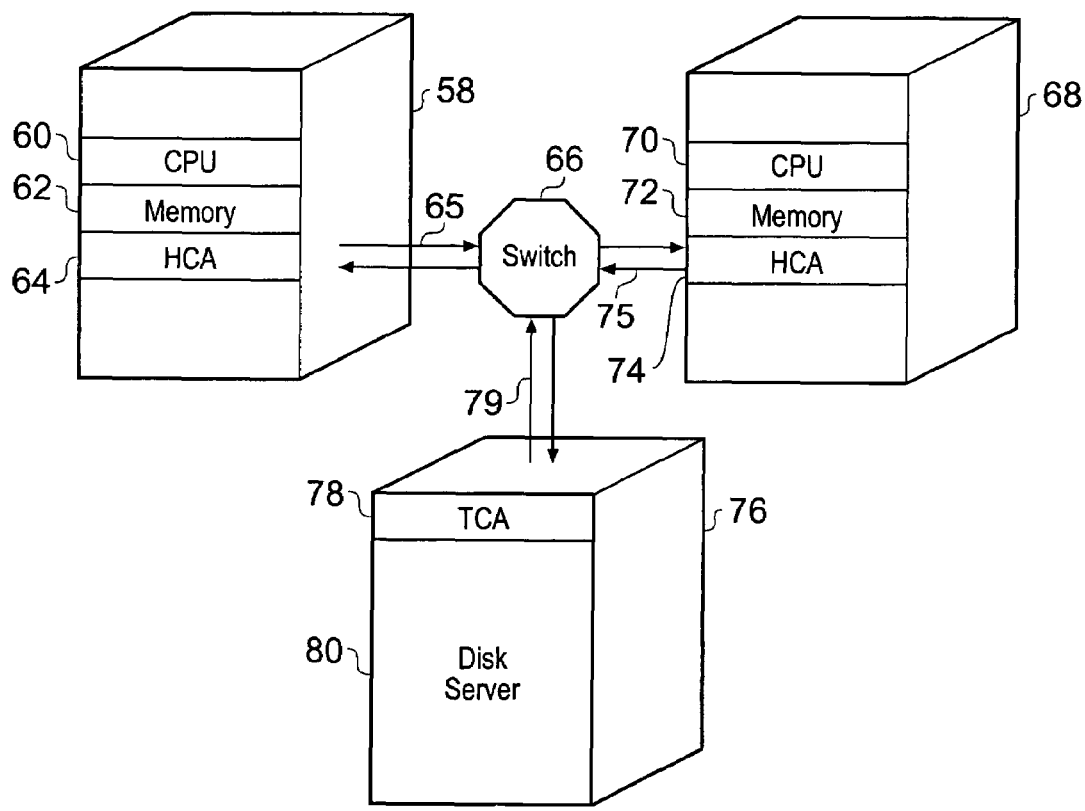
FIG. 9 is a schematic block diagram showing an arrangement where the Infiniband™ Architecture is used as an interconnect between computer systems.

Examples of simple Infiniband™ Architecture systems are shown in FIGS. 8 and 9. FIG. 8 shows an arrangement where the Infiniband™ Architecture is used to interconnect components within a standard computer system rack 50. In this example, the CPU, Memory and a Host Channel Adapter 52 are interconnected using conventional non-Infiniband™ Architecture techniques. The CPU, Memory and Host Channel Adapter 52 communicate via an Infiniband™ Architecture interconnect 53 with a Target Channel Adapter 54. The Target Channel Adapter 54 communicates with a disk drive unit 56 via a SCSI (Small Computer System Interface) connection. Thus, the Infiniband™ Architecture is configured in this example to facilitate communications between elements of the same computer system.

FIG. 9 shows an arrangement where the Infiniband™ Architecture is used only as an interconnect between computers. In this example, a first computer system is mounted in a rack 58, and comprises a CPU 60, memory 62 and a Host Channel Adapter 64 interconnected via conventional non-Infiniband™ Architecture techniques. Via the Host Channel adapter 64, the first computer system communicates to and from a switch 66 across interconnects 65. Also connected to the switch 66 is a second computer system mounted in a rack 68 and comprising a CPU 70, memory 72 and a Host Channel Adapter 74 that connects to the switch 66 via interconnects 75. Data storage for the first and second computer systems is provided by a disk server 80 mounted in a rack 76. The disk server 80 connects with a Target Channel Adapter 78 also mounted within the rack 76 by conventional non-Infiniband™ Architecture techniques. The Target Channel Adapter 78 connects to the switch 66 via interconnects 79. Thus, the Infiniband™ Architecture is configured in this example to facilitate communication between more than one distinct computer system. There is no limitation that the techniques of the examples of FIGS. 8 and 9 should be practised separately; a computer system using the Infiniband™ Architecture for internal communications may also be connected to other computer systems via a network based on the Infiniband™ Architecture.

Thus there has now been described an overview of the Infiniband™ Architecture for computer networking with examples of how it may be put into practice. Further details may be found in the above referenced Infiniband™ Architecture Specification Volumes 1 and 2, available from the Infiniband™ Trade Association, the contents of which are hereby incorporated hereinto by reference.

Within the physical layer of an Infiniband™ Architecture device (node), there is a hardware arrangement for ensuring that the data packets are correctly configured for transmission and for receiving data packets which have been transmitted, such that the headers within the packets can be read to determine further actions to be taken with respect to those packets (e.g., retransmission, forwarding to a given Queue Pair). One arrangement is shown in FIG. 10.

Figure 10:
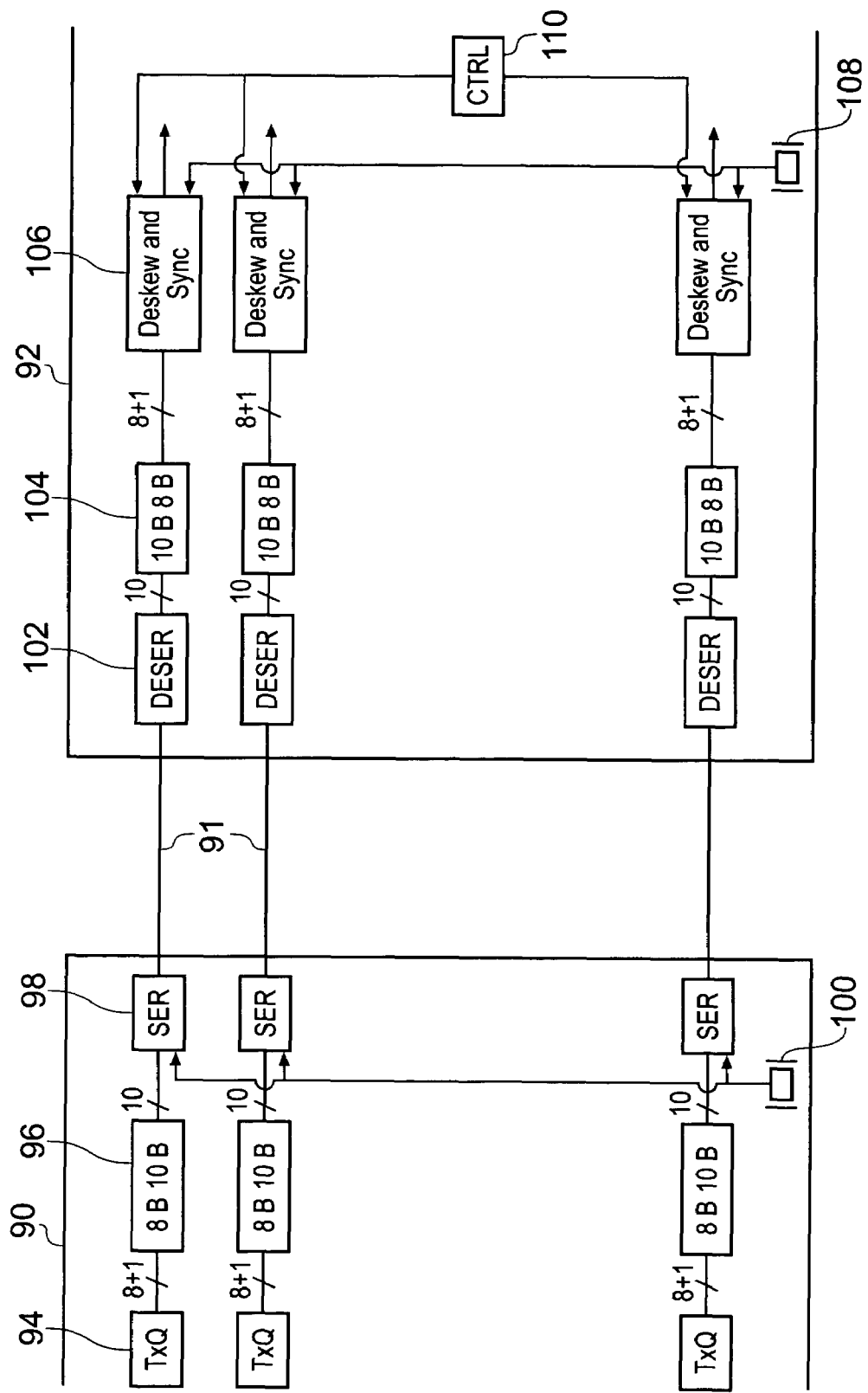
FIG. 10 is a block diagram showing schematically the transmitter and receiver hardware corresponding to a number of lanes linking two Infiniband™ Architecture nodes.

In FIG. 10 there is shown the transmission and reception hardware corresponding to a number of lanes linking two Infiniband™ Architecture nodes. The transmitter hardware 90 is shown on the left-hand side of the figure, connected via a number of signal carrier paths 91 (each path corresponding to a separate lane) to the receiver hardware 92, shown on the right-hand side of FIG. 10. It should be understood that each link between two nodes comprises one or more lanes in each direction, such that both nodes comprise both receiver and transmitter hardware.

Within the transmitter 90 there are a number of lane circuits, each arranged to transmit symbols allocated to a particular lane. Each symbol comprises 8 data bits (1 byte) plus a special bit to indicate the special comma and skip symbols, thus totalling 9 bits. The time taken for a symbol to be clocked through a register or other clocked component is described as a symbol cycle or a symbol period. Each lane circuit comprises a Transmit Queue (TxQ) 94, which outputs data on an 8+1 bit wide data bus to an 8+1 to 10 bit encoder (8B10B) 96 which in the present embodiment uses a similar encoding scheme to that used for IEEE 802.3z Gigabit Ethernet and so-called "fibre-channel" systems. The ten bit encoding serves to ensure that the data line toggles (performs a transition) sufficiently regularly that the receiver 92 is able to regenerate the transmitter clock from the received data signal. The encoder 96 encodes the data byte to a ten bit message which is output on a 10 bit wide data bus to a serialiser (SER) 98. Serialiser 98 imports the parallel bits from the 10 bit wide data bus and outputs them as a serial sequence as is conventionally known. The serial output from the serialiser 98 is then passed over the signal carrier path 91. All of the lane circuits are driven from the same clock signal, provided by clock 100, and thus the outputs from each of the serialisers 98 are synchronous with one another.

As is conventionally known, transmitting signals in parallel via separate signal paths may result in skewing of the received signals due to differing latencies of the different signal paths. Although it is theoretically possible to ensure that two separate signal paths have identical latencies, in practice this is almost impossible. Firstly, ensuring identical signal path length is time consuming and expensive, especially in the case of optical fibres. In addition, many factors in addition to length affect the latency of a signal path. For example, temperature can alter the length of a path by causing expansion or contraction of the path medium. Also, pressure on an optical fibre can alter the speed of light travelling therethrough; indeed it is known to make pressure sensors using optical fibres exploiting this property. All these factors add up to differential latency between different lanes.

At the receiver 92, the signal received on each signal carrier path (lane) 91 is passed to a receiver lane circuit. Each receiver lane circuit comprises a deserialiser (DESER) 102, which receives the serial data stream and converts it back into a 10 bit wide parallel signal. A 10 bit wide data bus carries the 10 bit wide signal from the deserialiser 102 to a 10 bit to 8+1 bit decoder (10B8B) 104. The decoder 104 reverses the encoding applied by the encoder 96 in the transmitter 90. Thus an 8+1 bit signal corresponding to the 8+1 bit signal output from the Transmitter Queue 94 in the receiver is output from the decoder 104 in the receiver 92.

In a one lane system, the only problems for data transmission and recovery are that the receiver and transmitter clocks are likely to be two distinct clock sources, such that initial difference and drift between the two clocks must be compensated for. However, in a multi-lane system skew latency comes into effect, such that a deskewing circuit may be implemented. Skew latency is the term used to describe a situation where a difference in latency between two channels carrying data in parallel causes data transmitted over those channels to arrive with a time-offset (i.e., skew) between channels. The deskewing circuit is necessary because data on each separate lane is captured by a regenerated clock linked to that particular lane. Although the Infiniband™ Architecture specification requires that all lanes shall be generated from a single clock source (e.g., transmitter clock 100 in FIG. 10), skew latency will cause the regenerated clocks of the separate lanes to be out of phase alignment. The deskewing circuit must therefore synchronise the regenerated clocks from all lanes up to a single clock, align all the lanes such that ordered data sets transmitted in parallel are received correctly and compensate for differences between the transmitter and receiver clocks (clock tolerance compensation).

The clock tolerance compensation is required to compensate for a difference of up to ±100 ppm (parts per million) between the respective clock sources of the transmitter 90 and receiver 92. That is, the maximum frequency will be 100 periods per million periods for a ±100 ppm device, or one per 10,000. Thus the maximum frequency drift between devices at the two extremes of the tolerance range (a +100 ppm device and a −100 ppm device) will be 1 period per 5000 periods between the respective clock sources of the transmitter 90 and receiver 92. This maximum difference is specified by the Infiniband™ Architecture. This implies a 1 cycle phase shift every 5000 cycles. Skip sequences allowing phase adjustment are specified to be inserted at least every 4608 symbol cycles. If the Maximum Transfer Unit (i.e., maximum packet size) of the path is 4096+126 symbol cycles (126 being the maximum header size permitted by the Infiniband™ Architecture specification), this might intercept the skip period, giving a maximum skip interval of 8830 (i.e., 4608+4096+126) cycles. This results in a maximum phase shift of 8830/5000=1.77 cycles. If the Maximum Transfer Unit of the path is 2048+126 symbol cycles, the maximum phase shift is (2048+126+4608)/5000=1.36 cycles. This results in a case where phase adjustment can only be performed on a skip sequence occurring with a maximum interval of 8830 cycles for a 4 k byte Maximum Transfer Unit. By this time, the maximum phase drift caused by clock mismatch is 1.77 cycles (or 1.36 cycles of a 2 k Maximum Transfer Unit).

Lane to lane skew compensation must also be performed to remove the effects of skew latency between the lanes. The requirement for clock synchronisation also arises from the skew latency over the separate lanes. To perform clock synchronisation, a synchronisation elastic circular buffer is used. The buffer is elastic to provide for differences between the recovered clocks of the decoded signals from the different lanes.

Figure 11:
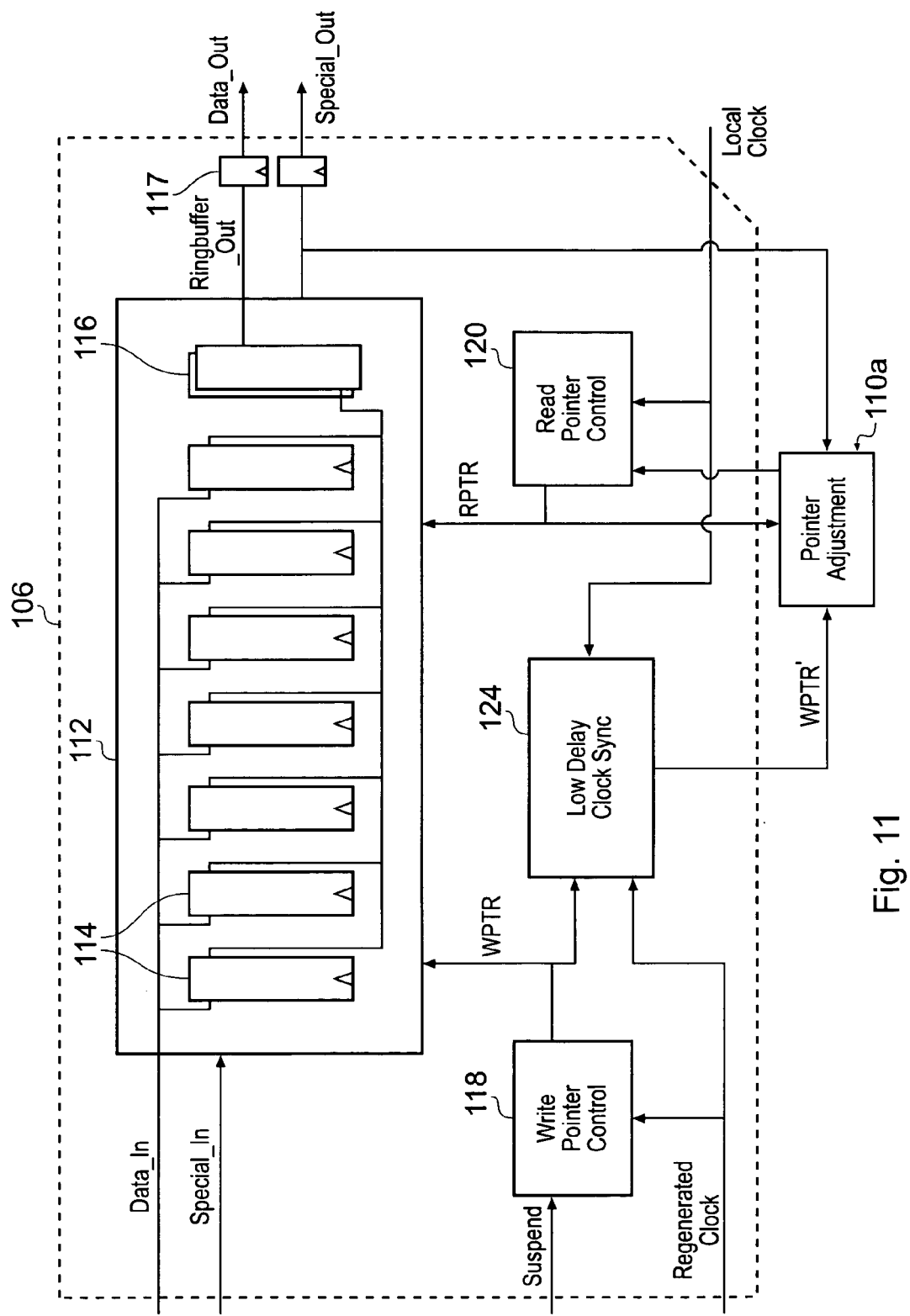
FIG. 11 is a block diagram showing schematically the deskew and synchronisation circuit of the receiver of FIG. 10.

In order to correct for the three problems of clock tolerance, lane to lane skew and clock synchronisation, a deskew and synchronisation circuit 106 based on an elastic ring buffer 112 is used. As shown in FIG. 11, one embodiment of the invention provides a minimum latency method for combining these three functions into a single circuit. As shown in FIG. 10, each lane has a separate deskew and synchronisation circuit 106. Each deskew and synchronisation circuit 106 has separate write pointer control logic 118 and read pointer control logic 120. The write pointer control logic 118 clock is a regenerated clock recovered from the data signals received by the receiver 92 for that lane. Such clock regeneration/recovery uses a phase-locked-loop within the deserialiser 102 to track the transitions in the data stream arriving at the receiver 92 over a particular lane. On the other hand, the clock for the read pointer control logic 120 is driven from the receiver clock 108, which is the same clock used for all the lanes of the receiver 92. As discussed above, the write pointer control logic and read pointer control logic clocks will likely not be phase aligned due to the permitted clock tolerance between connected devices. In addition, the write pointer clocks of the different lanes will likely not be phase aligned due to the different latencies of the particular lanes.

The input passed to each lane's buffer 112 of the deskew circuit from the decoder 104 may have a maximum drift of 8 symbol clocks, 6 symbol cycles of lane skew (as specified by the Infiniband™ Architecture specification) and 2 cycles of clock drift (as discussed above). The buffer 112 is therefore sufficiently large to accommodate this maximum skew.

In the present embodiment, the buffer 112 is implemented as a set of registers 114. A write to a particular register 114 is performed by controlling a clock enable to each register 114 from the write pointer control logic 118. A read from a particular register 114 is performed by control of a multiplexer (MUX) 116 from the read pointer control logic 120. The output data stream from the multiplexer 116 is passed through a one symbol cycle delay 117, such that DATA_OUT lags RINGBUFFER_OUT by one symbol cycle. More precisely, the read control includes a counter controlling the select input to the multiplexer, selecting the register in a circular manner. Read operations are performed simultaneously for all lanes, as controlled by the single receiver clock 108 (shown in FIG. 10). The pointer adjustment block 110a of each lane is operable to detect the difference between the relative positions of the write pointer and the read pointer about the buffer 112. This is achieved using a low delay synchronisation method with an accuracy of one cycle, as will be described in more detail below.

The deskew and synchronisation circuits 106 for all lanes are controlled by common deskew control and pointer adjustment logic 110 (shown in FIG. 10). The control logic 110 detects skip sequences and enables pointer adjustment at arrival of skip sequence symbols. Control logic 110 further comprises a forward-looking detection scheme to enable on-the-fly detection of inserted or deleted symbols without adding cycles to the data transfer path.

The recovered clock for each lane is input to the write pointer control logic 118 to enable the write pointer (WPTR) to be generated. The write pointer controls the write position for the current input data, which for each lane consists of a data byte plus a single bit indicating whether or not the data byte represents a special character according to the Infiniband™ Architecture specification.

The write pointer for each lane is synchronised to the local clock through a low delay clock synchroniser 124.

Figure 12A:
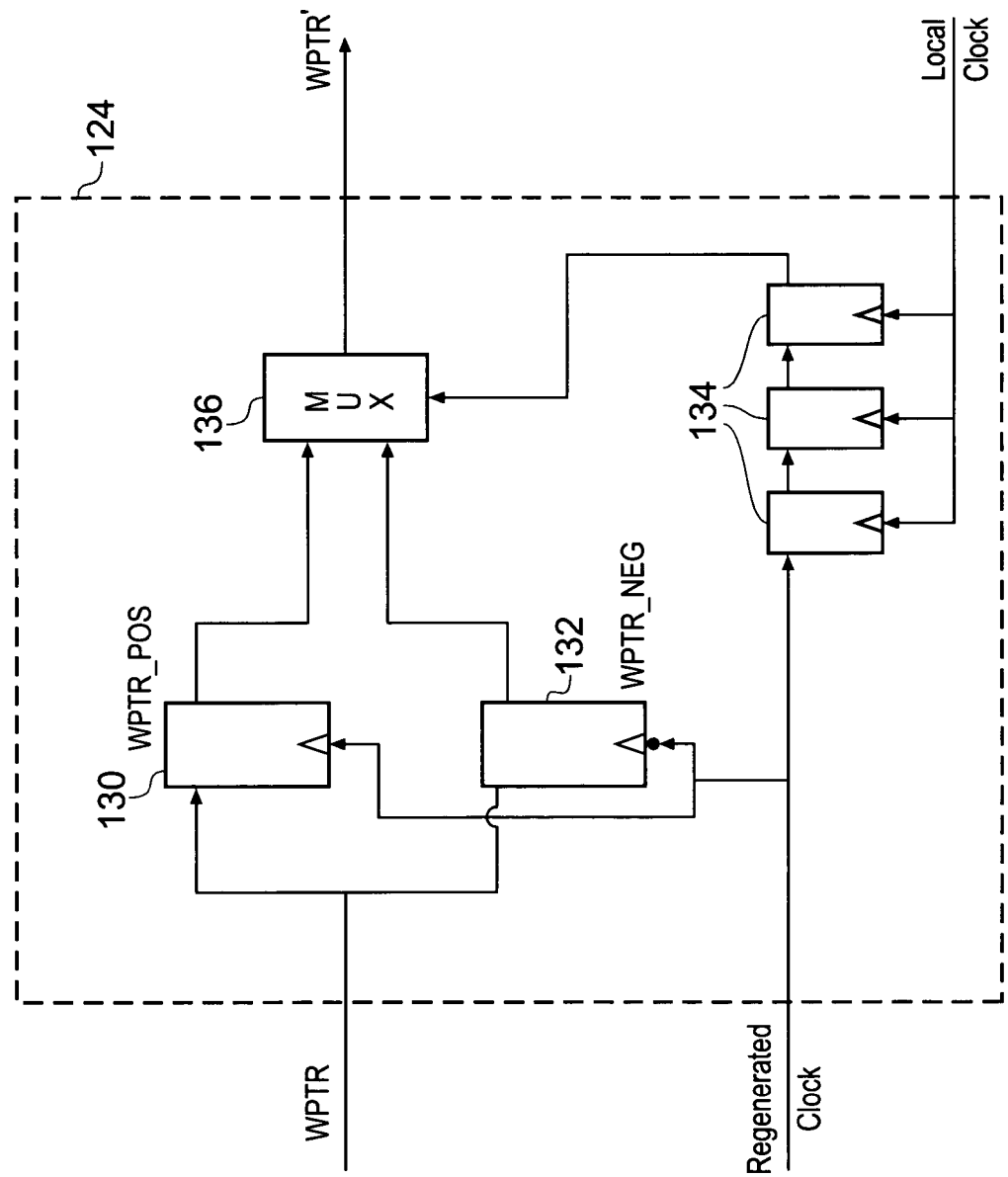
FIG. 12a is a block diagram showing schematically the low delay clock synchroniser of FIG. 11.

One embodiment of the low delay clock synchroniser 124 is shown in more detail in FIG. 12a. The low delay clock synchroniser of FIG. 12a comprises two registers 130 and 132, one rising edge clocked 130 and one falling edge clocked 132 (WPTR_POS and WPTR_NEG respectively). The regenerated (write) clock (W_CLK) is sampled with the local clock and reclocked a number of times, to prevent any metastability, by registers 134. This sampled clock basically indicates whether the regenerated clock is arriving before or after the local clock. The regenerated clock is fed to the input of an edge-triggered flip-flop 134, clocked by the local clock. If the positive edge of the regenerated clock arrives before the positive edge of the local clock, the register output will be a logic one, and if it arrives later the register output will be a logic zero. This register output is fed through a further two edge triggered flip-flops 134 to reduce the likelihood of metastability. This sampled signal is used directly to control a 2:1 multiplexer 136 selecting between the WPTR_POS and WPTR_NEG signals. When the sampled clock value is a logic one WPTR_NEG is selected, and when the sampled clock value is logic zero WPTR_POS is selected. The output from the low delay clock synchroniser 124 is an adjusted write pointer signal WPTR'. This scheme therefore ensures that the clock selected is always the one providing the optimum margin with respect to the local clock.

FIG. 12b illustrates the relationship between the write (regenerated) clock and the WPTR_POS and WPTR_NEG signals output from the registers 130 and 132. As can be seen from the figure, the WPTR_POS signal is clocked using the leading edge (rise) of the W_CLK clock pulse and the WPTR_NEG signal is clocked using the trailing edge (fall) of the W_CLK clock pulse. The data values illustrated within the signals are present merely to demonstrate the timing relationship between the two signals and are not indicative of actual data values required for successful operation of the system.

FIG. 12c illustrates the minimum possible latency introduced by the clock synchroniser 124. This minimum scenario occurs when the W_CLK is sampled as low by the leading edge (rise) of the local (read) clock. Such a sampling result indicates that the read clock is located in the last half of the write clock period, and thus the positive clocked signal WPTR_POS is selected since this will obtain the optimal margin with respect to setup and hold conditions for WPTR in relation to the local clock. The setup condition is the time from stabilisation of the data/WPTR until a rising edge on the local clock, and the hold condition is the time from a rising edge of the local clock until a change in the data/WPTR. The object of the multiplexed WPTR_POS/WPTR_NEG arrangement is to ensure stability in the data clocked by the clock edge, thereby sidestepping any instabilities caused due to imperfections in components whilst maintaining low latency. This is made possible due to the close frequency relationship between the local clock and the regenerated clock. In this case, the minimum delay from WPTR to WPTR' is 0.5 cycles, although it may be as great as 1.5 cycles, depending on the exact relation between the two clocks.

FIG. 12d illustrates the maximum possible latency introduced by the clock synchroniser 124. This maximum scenario occurs when the W_CLK is sampled as high by the leading edge (rise) of the local (read) clock. Such a sampling results indicates that the read clock is located in the first half of the write clock period, and thus the negative clocked signal WPTR_NEG is selected since this will obtain the best margin with respect to setup and hold conditions for WPTR in relation to the local clock. In this case the maximum delay from WPTR to WPTR' is 1.5 cycles, although it may be as small as 0.5 cycle, depending on the exact relation between the two clocks.

A prerequisite for using this technique is that there should be a close phase relationship between the two clocks. This is the case here as the relationship is set by the Infiniband™ Architecture standard to be within certain limits, as discussed above.

As shown in FIG. 11, the synchronised clock from the synchroniser 124 is input into the pointer adjustment block 110a, part of the deskew control and pointer adjustment logic 110. The pointer adjustment block 110a keeps track of the pointer difference (e.g., the difference in position about the buffer 112 between the write pointer (WPTR) and the read pointer (RPTR)) for ensuring that this difference is kept within predefined limits.

The write pointer (WPTR) and read pointer (RPTR) are the actual addresses of the registers 114 within the buffer 112 where the data are written into and read out from the ring buffer 112 respectively. These pointers must be adequately separated to avoid pointer collision; it is therefore important to be able to monitor and adjust pointer separation.

Taking into account the uncertainty introduced by the clock synchroniser 124 and the maximum frequency drift between receiver and transmitter clocks, the following scheme may apply, where offset is an explicit parameter to determine pointer separation. The delay values are the delay through the circular buffer 112 based on the low delay synchronisation circuit 124. The offset is used to provide adequate separation between the read and write pointers.

| Offset | Delay min/symbol cycles | Delay max/symbol cycles | Applicable for |
|---|---|---|---|
| 0 | 0.5 | 1.5 | None |
| 1 | 1.5 | 2.5 | Up to 4096 MTU |
| 2 | 2.5 | 3.5 | Rugged mode |

Rugged mode may be used in circumstances where a high error tolerance is required, for example if the clock drift is expected to exceed the 100 ppm limit.

In one embodiment, the pointers can only be adjusted on arrival of skip sequences, so the offset after initialisation and after adjustment must be sufficiently large that the maximum possible clock drift of 1.77 clock cycles between adjustments will not cause data corruption due to pointer collision. The pointer separation will then be adjusted by the pointer adjustment logic 110a following the above scheme.

The data flow through the ring buffer 112 immediately after an adjustment using a skip sequence (i.e., the optimal condition) is shown in FIG. 13a, with a worst case clock drift scenario being illustrated in FIG. 13b.

As shown in FIG. 13a, DATA_IN is written into the ring buffer 112 on a positive regenerated clock edge. The write pointer as generated from the regenerated (write) clock is adjusted to the local (read) clock domain by the clock synchroniser 124, thereby generating the WPTR' signal. Following the above given offset=1 scheme, the read pointer RPTR is offset by one from the adjusted write pointer. Thus, the data passing into the buffer 112 passes out of that buffer after a delay of 2.5 symbol cycles (1 cycle from WPTR to WPTR_POS, 0.5 cycle through the synchroniser and 1 cycle from RINGBUFFER_OUT to DATA_OUT)) as shown. In FIGS. 13a and 13b, the data symbols used as examples have the following meanings: SDP—Start of Data Packet; DTA—Data Packet; EGP—End of Good Packet; COM—Comma (delimit) symbol; SKP—Skip symbol.

Shown in FIG. 13b is the case where the regenerated clock is faster than the local clock by the maximum allowed amount, thereby giving a worst case drift scenario. In this case, the drift causes a shift of 1.77 cycles "left" such that the read pointer RPTR is now only 1 cycle ahead of the actual write pointer WPTR (i.e., RPTR indicates a given buffer register 114 immediately after WPTR finishes pointing to that register). Thus the transfer time from DATA_IN to DATA_OUT is in fact reduced to 2 cycles, but the pointer difference is at the limiting case for prevention of data corruption caused by pointer collision. In the case (not shown) where the regenerated clock is slower than the local clock, then the risk of pointer collision is not present, but the latency is increased by 1.77 cycles to approximately 5.27 cycles.

The pointer adjustment block 110a (see FIG. 11) operates to adjust the pointers to an optimal pointer spacing during a skip sequence to maintain optimum system operation. A single pointer adjustment block 110a operates on the pointers for all lanes simultaneously. The pointer adjustment block 110a operates on the synchronised write pointer WPTR', the read pointer RPTR and the special bit of the output of the ring buffer 112. A number of comparators are used to identify comma and ordered sequences among all the lanes using the special bits of the data output from the buffer 112. The comparators also determine the pointer difference by comparing the read pointer (RPTR) and the synchronised write pointer (WPTR'). The multiplexer 116 of the buffer 112 is in fact a pair of multiplexers, allowing the read logic access to both the contents of the current read address and the next read address. The availability of the next read address is used by the pointer adjustment block 110a in the forward looking detection scheme (described below).

The ring buffers undergo an initial training to compensate for lane to lane skew. The training action is controlled by a link state machine as defined in the Infiniband™ Architecture specification (at Volume 2, section 5.7.4). In the configuration state, the control block 110 senses for training sequences. The start of a training sequence is indicated by the presence of a comma symbol on one or more lanes when the control block 110 is in the training state. After a predetermined number of cycles, the write to the ring buffer 112 is inhibited such that each ring buffer holds the start of the training sequence. The pointer adjustment block 110a then increments the read pointer for each lane until the training sequence start is aligned on all lane outputs. Thus, lane to lane skew caused by skew latency on the different lanes is compensated for by the receiver. During the training process, the pointer adjustment block 110a also adjusts the pointer separation according to the predetermined separation scheme as discussed above. The training process uses a predetermined training sequence generated and transmitted by the transmitter. The predetermined training sequence is defined in the Infiniband™ Architecture specification.

To enable on-the-fly clock drift compensation during normal operation, skip ordered sets are transmitted periodically as discussed above. Each skip set consists of a starting comma character followed by three skip symbols on all lanes. However, if a timing repeater (used to recover from a potentially weakened signal strength and built-up jitter between two endnodes of a link) is present on a link this may compensate for clock drift by adding or deleting one skip symbol in one or several lanes, this action is independent from one lane to another. Thus the Infiniband™ Architecture specification sets out that receivers shall recognise skip ordered sets of one comma symbol followed by between 1 and 5 skip symbols. If the pointer adjustment block 110a detects a too small or too large pointer spacing, then the read and write pointers are controlled to insert or delete skip symbols into the set. Deleting of symbols is achieved by incrementing the read pointer by one such that one register 114 of the ring buffer 112 is not read from. This skipped data must be a skip symbol, which can be checked using the forward looking read procedure to check that the symbol to be omitted is indeed a skip symbol. Inserting of symbols is achieved by causing the read pointer to stay in place over two read cycles such that it reads the same symbol twice.

Figure 14:
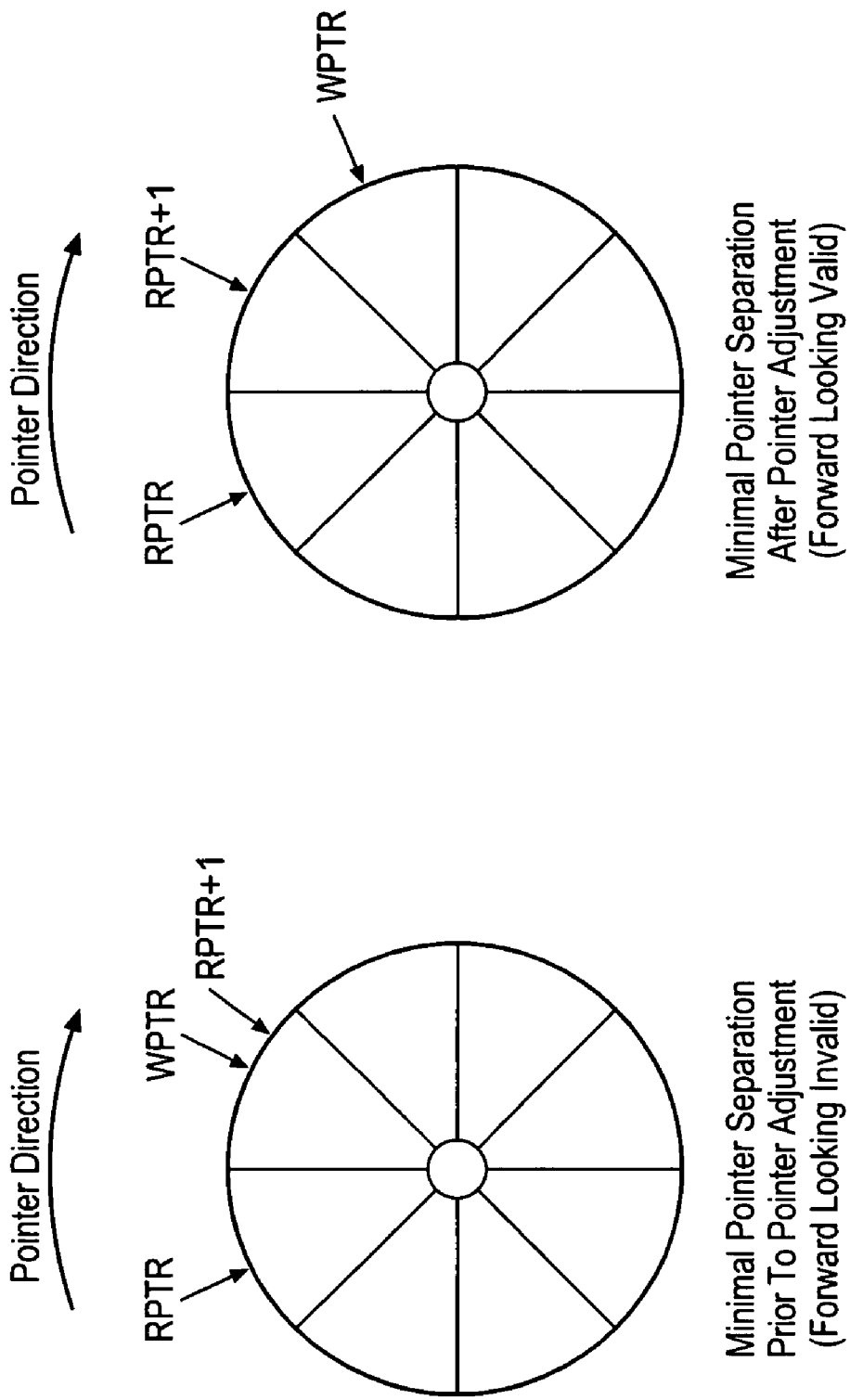
FIG. 14 is a schematic diagram showing the operation of the forward looking pointer adjustment circuit of FIG. 11.

The forward looking scheme is used to enable latency optimisation of the receiver 92. The forward looking scheme relies on the fact that at any time the pointer difference after a comma is received and clock compensation is performed (by the clock compensator 124) will always be greater than 2.0 cycles (see FIG. 13b). This allows the read logic to fetch the content from the next read address RPTR+1 (because it has already been written there) and in some cases the read address after next RPTR+2 and guarantee that the output will not be affected. This is permitted by the pair of multiplexers 116. The forward looking enables the read logic to "foresee" what symbol will occur in the next cycle. Using this input to the adjustment scheme allows synchronous control of the pointers when handling timing repeater inserted and deleted skip even with minimal pointer separation, as illustrated in FIG. 14. As shown in FIG. 14, provided the pointer difference is 2 cycles or more, then the forward looking scheme provides a valid output.

Thus there has now been described a system which can compensate for lane to lane skew (via training), compensate for clock tolerance between transmitter node and receiver node (via clock compensation) and compensate for clock drift between transmitter node and receiver node (via forward looking based skip sequence utilisation), with a minimum of receiver added latency. This system provides a fast (low latency) and efficient (simple circuitry) method of recovering data transmitted over one or more lanes.

A first example of the operation of a receiver according to a particular aspect of the invention will now be described with reference to FIG. 15.

Figure 15:
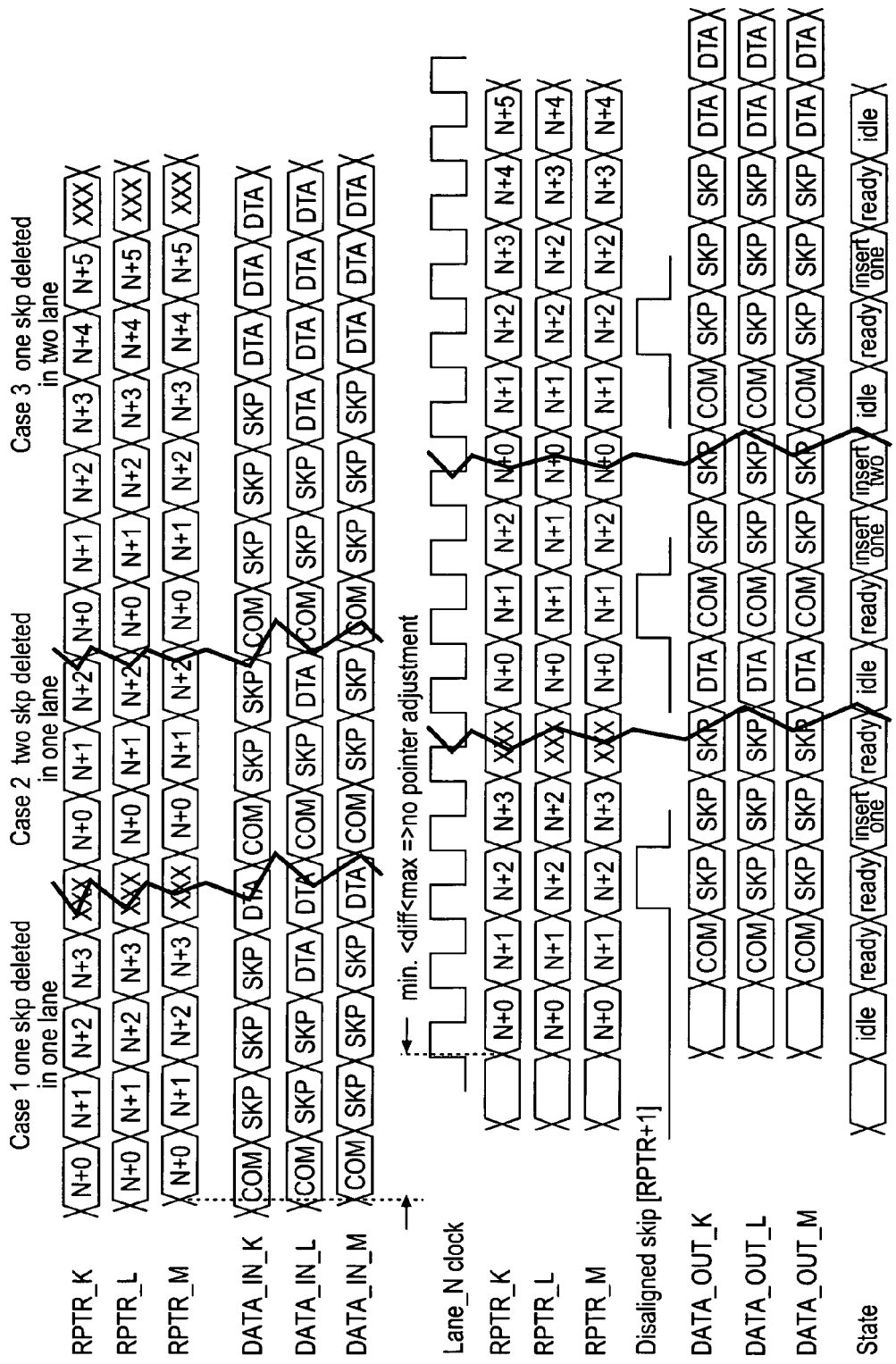
FIG. 15 is a schematic timing diagram for a system with three lanes where no pointer adjustment is required.

Shown in FIG. 15 is a timing diagram for a system with three lanes (lanes K, L and M) where no pointer adjustment is required (i.e., pointer separation is within tolerance). Three sub-cases are shown, each corresponding to a different combination of timing repeater deleted skip symbols. As the pointer difference is first identified as acceptable, forward looking by creating a volatile read pointer (RPTR+1) may be performed.

In case 1, one skip symbol has been deleted by an in-lane timing repeater in lane L, with lanes K and M unaffected. Using the forward looking detection system, the pointer adjustment block 110a detects the comma symbol on each lane followed by the skip symbols. The pointer adjustment block 110a has no need to adjust the pointer spacing, but detects the missing skip symbol on lane L relative to lanes K and M. Thus the read pointer for lane L (RPTR_L) is adjusted by the pointer adjustment block 110a, such that the second skip symbol on lane L is read twice by the read logic and the output from the buffer 112 for lane L comprises three skip cycles, and the start of the data symbols is aligned across all three lanes.

In case 2, one skip symbol has been deleted by an in-lane timing repeater in each of lanes K and M, with two skip symbols having been deleted in lane L. Thus there are only two skip symbols in the skip sequence in lanes K and M and only one skip symbol in the skip sequence in lane L. This is detected by the pointer adjustment block 110a using the forward looking detection system. As there is no requirement for the skip sequences to be three skip symbols long at data output, the pointer adjustment block 110a controls the read pointer for lane L (RPTR_L) such that the one skip symbol input to the buffer 112 from lane L is read twice (e.g., by holding the pointer to the same register 114 of the buffer 112 for two cycles instead of the usual one cycle) and the read pointers for lane K and M are incremented normally. Thus the data output for all lanes has a skip sequence of two skip symbols, with the following data symbols being correctly aligned.

In case 3, one skip symbol has been deleted by an in-lane timing repeater in each of lanes L and M, with lane K unaffected. This is detected by the pointer adjustment block 110a using the forward looking detection system. The pointer adjustment block 110a therefore adjusts the read pointer of each of lanes L and M (RPTR_L and RPTR_M) to read the second skip symbol in the skip sequence for each lane twice (e.g., by holding the pointer at the register 114 of the respective buffers 112 storing the second skip symbol for two read cycles) such that the data output for all three lanes has a skip sequence of three skip symbols followed by aligned data symbols across the three lanes.

A second example of the operation of a receiver according to a particular aspect of the invention will now be described with reference to FIG. 16.

Figure 16:
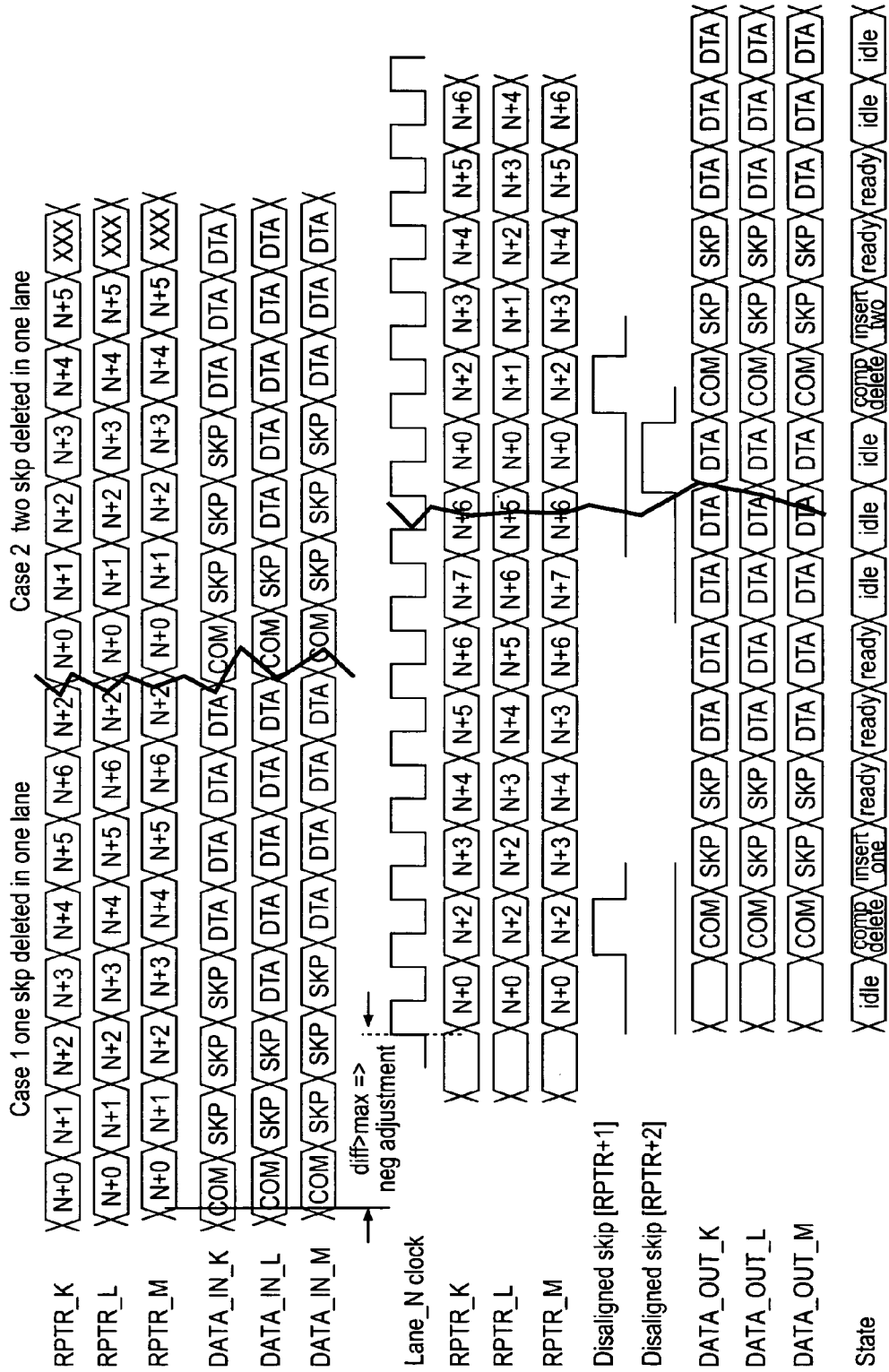
FIG. 16 is a schematic timing diagram for a system with three lanes where negative pointer adjustment is required.

Shown in FIG. 16 is a timing diagram for a system with three lanes (lanes K, L and M) where negative pointer adjustment is required (e.g., pointer separation is not within tolerance and the pointer separation needs to be reduced). Two sub-cases are shown, each corresponding to a different combination of timing repeater deleted skip symbols.

In case 1, to perform the pointer alignment the pointer adjustment block 110a causes all of the read pointers to be incremented by two, such that the N+1 read cycle is missed out for all lanes and the read pointers continue from the N+2 read cycle. This is made possible by use of the forward looking scheme to determine that the data at the N+2 cycle is a skip symbol. It is possible to look forward by two cycles in this case as the fact that the pointer difference required negative correction (e.g., by skipping a read address) means that the data to be read out in two cycles time has already been written to the relevant register 114 of the buffer 112.

Once the pointer difference is corrected, it is noted by the forward looking scheme that one skip symbol has been deleted from lane L by an in-lane timing repeater. Thus a total of two skip cycles are present in lane L, and three skip cycles in lanes K and M. The first of the skip cycles in each lane has already been missed to perform the pointer difference adjustment. Thus, lane L has one skip cycle remaining and lanes K and M have two skip cycles remaining. The pointer adjustment block 110a therefore controls the lane L read pointer (RPTR_L) to read the second of lane L's skip symbols twice, thereby inserting an extra skip symbol into the data sequence output from lane L. Thus the data output from the lanes has a skip sequence of two skip symbols followed by aligned data symbols across all three lanes.

In case 2, to perform the pointer alignment the pointer adjustment block 110a uses the forward looking scheme to determine whether it will be possible to cause all of the read pointers to be incremented by two, such that the N+1 read cycle is missed out for all lanes and the read pointers continue from the N+2 read cycle. In the present case this is detected not to be possible as lane L has only one skip symbol in the skip sequence, the other two skip symbols which should have been present having been deleted by an in-lane timing repeater. This is made possible by use of the forward looking scheme to determine that the data at the N+2 cycle is not a skip symbol. It is possible to look forward by two cycles in this case as the fact that the pointer difference required negative correction (e.g., by skipping a read address) means that the data to be read out in two cycles time has already been written to the relevant register 114 of the buffer 112.

Thus in the case of lanes K and M, the read pointer is incremented by two to skip forward one cycle, missing out one of the skip symbols. On the other hand, the read pointer for lane L is directed to the first (only) skip symbol in the skip sequence on that lane by incrementing the read pointer (RPTR_L) normally. Thus, after this first adjustment, the read pointers for each of lanes K and M (RPTR_K and RPTR_M) are directed to the second skip symbol in the skip sequence for those lanes and the read pointer for lane L is directed to the first (only) skip symbol in the skip sequence for that lane. As lane L had two skip symbols deleted, there is still a mismatch. Therefore, for the next cycle the lane K and M read pointers are incremented as normal to read the third skip symbol in the skip sequence for those lanes, and the lane L read pointer is again held in place to read the first (only) skip symbol in the skip sequence for that lane. Thereby the data output from the lanes has two skip symbols in the skip sequence and the data following thereafter is aligned across all three lanes.

A third example of the operation of a receiver according to a particular aspect of the invention will now be described with reference to FIG. 17.

Figure 17:
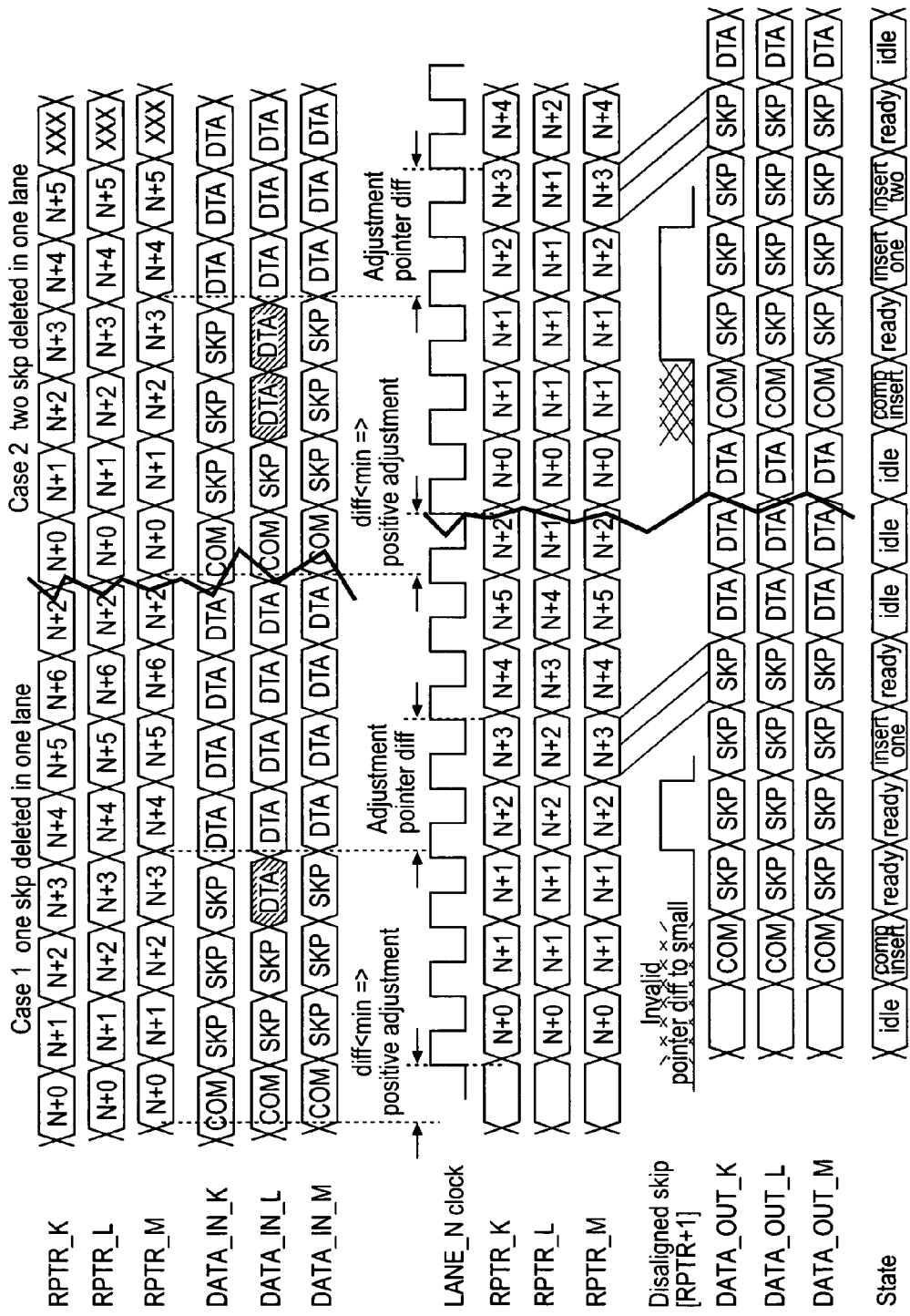
FIG. 17 is a schematic timing diagram for a system with three lanes where positive pointer adjustment is required.

Shown in FIG. 17 is a timing diagram for a system with three lanes (lanes K, L and M) where positive pointer adjustment is required (e.g., pointer separation is not within tolerance and pointer separation needs to be increased). Two sub-cases are shown, each corresponding to a different combination of timing repeater deleted skip symbols.

In this example, the pointer adjustment comprises causing the read pointers to be held at a particular register 114 of the buffer 112 for an additional clock cycle, such that the separation from the write pointer is increased. This has the effect of adding an extra skip cycle into the output data stream on each lane. As the read pointer is too close to the write pointer pre-adjustment, it is not possible to use the forward-looking scheme as it is not certain that the next register 114 of the buffer 112 contains valid data.

In case 1, the pointer adjustment block 110a detects the too-small pointer separation and provides a correction by causing the read pointers on all lanes to read from the first skip symbol in the skip sequence twice, such that the pointer separation is increased to the required level. The pointer adjustment block 110a is then able to use the forward looking scheme to detect that lane L has had one skip symbol deleted from the skip sequence by an in-lane timing repeater. Thus, while the read pointers for lanes K and M are permitted to increment normally from the first skip symbol (after the second reading thereof) to the second skip symbol, and then from the second skip symbol to the third skip symbol of the skip sequence for those lanes, the read pointer for lane L is allowed to increment normally from the first skip symbol (after the second reading thereof) to the second skip symbol but is then held in place to read the second skip symbol a second time to allow for the fact that lane L has no third skip symbol in its skip sequence. Thus the data output for all three lanes comprises a skip sequence of four skip symbols (the extra symbol for the separation correction and then the three standard skip symbols including the added symbol for lane L making up for the deleted symbol) and thereafter data symbols are aligned across the three lanes.

In case 2, the pointer adjustment block 110a detects the too-small pointer separation and provides a correction by causing the read pointers on all lanes to read from the first skip symbol in the skip sequence twice, such that the pointer separation is increased to the required level. The pointer adjustment block 110a is then able to use the forward looking scheme to detect that lane L has had two skip symbols deleted from the skip sequence by an in-lane timing repeater. Thus, while the read pointers for lanes K and M are permitted to increment normally from the first skip symbol (after the second reading thereof) to the second skip symbol and then from the second skip symbol to the third skip symbol of the skip sequence for those lanes, the read pointer for lane L is held in place to read the first skip symbol a third time and a fourth time to allow for the fact that lane L has no second or third skip symbols in its skip sequence. Thus the data output for all three lanes comprises a skip sequence of four skip symbols (the extra symbol for the separation correction and then the three standard skip symbols including the added symbols for lane L making up for the deleted symbols) and thereafter data symbols aligned across the three lanes.

A fourth example of the operation of a receiver according to a particular aspect of the invention will now be described with reference to FIG. 18.

Shown in FIG. 18 is a schematic diagram of the ring buffer 112 of twelve lanes showing the behaviour of the read and write pointers when performing a clock compensation delete of the same magnitude to the buffer 112 of each individual lane. The buffers on the left-hand side (a) are shown before the adjustment and the buffers on the right-hand side (b) are shown after the adjustment. The register 114 being addressed by the write pointer is indicated by one pattern and the register 114 being addressed by the read pointer is indicated by a different pattern.

In the pre-adjustment buffer, there is a minimum pointer separation of 4 cycles and a maximum separation of 7 cycles. The adjustment is then performed, incrementing all of the read pointers by two rather than the normal one. Thus in the post-adjustment buffer, there is a minimum pointer separation of 3 cycles and a maximum separation of 6 cycles. The relationship between the pointers across the lanes is not changed as a result of the adjustment, but the pointer separation is.

A fifth example of the operation of a receiver according to a particular aspect of the invention will now be described with reference to FIG. 19.

Figure 19B:
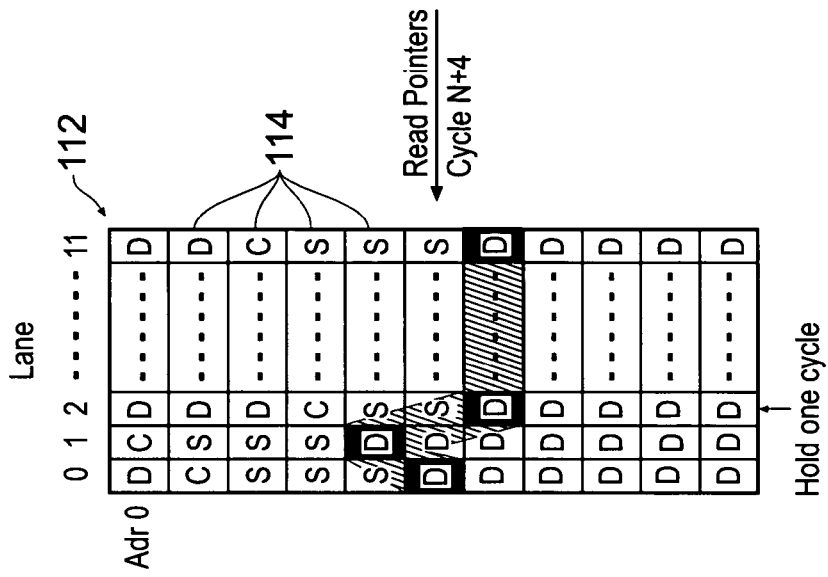
FIG. 19 is a schematic diagram showing the behaviour of the read and write pointers during a correction to a single read pointer following receipt of a disaligned skip.
Figure 19A:
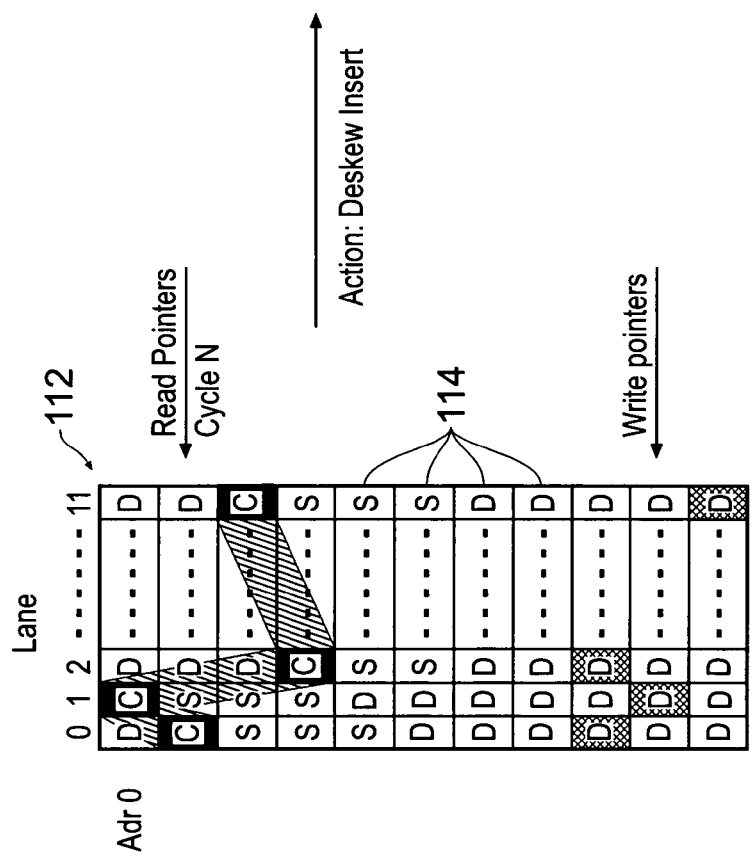

Shown in FIG. 19 is a schematic diagram of the ring buffer 112 of twelve lanes showing the behaviour of the read and write pointers when one read pointer is to be corrected in response to a disaligned (missing) skip being received. The buffers (a) on the left-hand side are shown before the adjustment and the buffers on the right-hand side (b) are shown after the adjustment. The register 114 being addressed by the write pointer is indicated by a crossed shading pattern and the register 114 being addressed by the read pointer is indicated by a grey shading pattern.

In the pre-adjustment buffer, the lane 2 skip sequence comprises only two skip symbols whereas the skip sequences for the other lanes all comprise three skip symbols. As discussed above, this is corrected for by holding the relevant read pointer in place for one cycle, to ensure that the data output will continue in alignment. The adjustment is then performed, incrementing all of the read pointers by one except the read pointer for lane 2, all the read pointers are then incremented by one to point to the next data symbol. Thus in the post-adjustment buffer, each lane's read pointer moves from a skip symbol to a data symbol during the same clock cycle.

A sixth example of the operation of a receiver according to a particular aspect of the invention will now be described with reference to FIG. 20.

Shown in FIG. 20 is a schematic diagram of the ring buffer 112 of twelve lanes showing the behaviour of the read and write pointers when performing a combined clock compensation delete of the same magnitude to the buffer 112 of each individual lane and a correction in response to a disaligned (missing) skip being received. The buffers are shown in sequence from left (a) to right (d) showing the adjustments performed at cycles N, N+1, N+2, and N+3. The register 114 being addressed by the write pointer is indicated by a crossed shading pattern and the register 114 being addressed by the read pointer is indicated by a grey shading pattern.

In this example, lane 2 has two skip symbols deleted from its skip sequence and the pointer separation is to be reduced. At read cycle N (a) the forward looking scheme determines that lane two has only one skip symbol, whereas the other lanes all have at least two skip symbols (look ahead by up to two cycles). Thus in order to reduce the pointer separation the read pointers for all lanes are incremented by two register positions instead of the usual one, except in the case of lane 2. As lane 2 has only a single skip symbol, the lane two read pointer is incremented by one register position. Thus the pointer separation is reduced by one register position for all lanes except lane 2. Any further adjustment of pointer separation with regard to lane 2 must wait until the next skip sequence is received.

Therefore at read cycle N+1 (b), the pointer difference is reduced for all lanes except lane 2 and the position of the read pointer of lane two is altered relative to the read pointers of all other lanes. Next, account must be taken of the fact that lane 2 has only one skip cycle, whereas the other lanes all have three skip cycles. The read pointer for lane 2 already points at the first (only) skip symbol for that lane and the read pointers for all other lanes point to the second skip symbol for those lanes. Therefore the next adjustment made is to hold the lane 2 read pointer in position for another read cycle such that at read cycle N+2 (c), all of the read pointers point to the last skip cycle present within their own respective skip sequences. Thus, at read cycle N+3 (d), all the read pointers point to the first data symbol in each lane following the skip sequence.

Thus it can be seen how the read pointers are adjusted in response to different incoming skip sequences to registers having different pointer separation adjustment requirements.

In summary, the total latency introduced by the deskew and synchronisation circuit 106 is as set out as follows:

| Offset | Delay min/ symbol cycles | Delay max/ symbol cycles | Delay without forward looking/ symbol cycles | Applications |
| --- | --- | --- | --- | --- |
| 1 | 2.5 | 3.5 | 5.0 | Normal operation |
| 2 | 3.5 | 4.5 | 6.0 | Rugged mode |

In the rugged mode referred to in the table above, one extra cycle of pointer separation is added to allow for excessive clock drift (e.g., clock drift exceeding that permitted by the Infiniband™ Architecture specification).

It will be immediately apparent to one skilled in the art that the embodiments and examples illustrated and described above show only a limited number of the possible modes by which the present invention may be employed. Many other arrangements and modifications thereto are possible without departing from the present invention.

One modification of particular note is that the present invention is not limited to Infiniband™ Architecture systems. Rather, it may be employed in any system where the problems addressed by the invention are to be found. In particular, networking systems other than Infiniband™ may be presented with problems of lane to lane deskew, clock drift and clock mismatch and may have the present invention applied thereto to address those problems.

As will be apparent to the skilled addressee, the logic and circuits required to implement the present invention may be manufactured in the form of discrete circuit components connected together (e.g., by means of a printed circuit board) or a purpose-designed integrated circuit (i.e., in hardware), in the form of a pre-programmed special purpose integrated circuit (i.e., in firmware) or in the form of a multi-purpose integrated circuit programmed via software.

The scope of the present invention is not to be limited by the above described embodiments and examples but is to be defined by the appended claims together with their full scope of equivalents.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising" used in the description and claims should not be construed to mean only "consisting only of".

What is claimed is:

1. A receiver for digital data, comprising:
a ring buffer operable to store received data;
a write pointer controller for the ring buffer operable to control the writing of received data into the ring buffer;
a read pointer controller for the ring buffer operable to control the reading of data from the ring buffer; and
a pointer adjustment controller operable, in response to a detection of a special data indicator, to control at least one of the write pointer controller and the read pointer controller using forward looking operable to foresee a data location within the ring buffer corresponding to a future read location of the ring buffer, wherein the pointer adjustment controller comprises a comparator to determine whether a special symbol present within the received data for a given lane is present in a time-aligned position within the received data for another lane.

2. The receiver of claim 1, wherein the pointer adjustment controller is operable to perform forward looking of at least one clock cycle.

3. The receiver of claim 1, wherein the pointer adjustment controller is operable to perform forward looking of at least two clock cycles.

4. The receiver of claim 1, wherein the read pointer controller is operable to use a volatile read pointer to allow a read of a data location corresponding to the future read location of the ring buffer.

5. The receiver of claim 1, wherein the pointer adjustment controller is operable to determine a result of the forward looking by inspection of a special character from the future read location.

6. The receiver of claim 1, wherein the pointer adjustment controller is operable to detect the write and read pointer locations as defined by the write and read pointer controllers respectively.

7. The receiver of claim 6, wherein the pointer adjustment controller is operable to detect the pointer positions by means of an asynchronous pointer detector.

8. The receiver of claim 6, wherein the pointer adjustment controller is operable to control the separation between write and read pointers about the ring buffer.

9. The receiver of claim 1, further comprising a clock regenerator for regenerating a clock signal used in transmission data of received at the receiver.

10. The receiver of claim 9, wherein the write pointer controller is controlled by the regenerated clock signal.

11. The receiver of claim 10, further comprising:
a local clock signal generator wherein the read pointer controller is controlled by a local clock signal generated by said clock signal generator;
wherein the receiver further comprises a clock synchroniser operable to synchronise a signal representative of the regenerated clock signal to a signal representative of the local clock signal.

12. The receiver of claim 1, further comprising, for each of multiple lanes over which digital data are receivable, a ring buffer and pointer controller.

13. The receiver of claim 12, wherein a single pointer adjustment controller is operable to control at least one pointer controller for each lane.

14. The receiver of claim 1, wherein the special data indicator comprises a data bit of said received data.

15. The receiver of claim 1, wherein the special data indicator indicates a special data symbol.

16. The receiver of claim 15, wherein the special data symbol is a skip symbol.

17. A receiver for digital data, comprising:
buffer means arranged as a ring buffer for storing received data;
write pointer control means configured to control the writing of received data into the buffer means;
read pointer control means configured to control the reading of data from the buffer means; and
pointer adjustment control means configured to control at least one of the write pointer control means and the read pointer control means using forward looking operable to foresee a data location within the buffer means corresponding to a future read location of the buffer means, the pointer adjustment control means being responsive to a detection of a special data indicator, wherein the pointer adjustment means is further configured to determine whether a special symbol present within the received data for a given lane is present in a time-aligned position within the received data for another lane.

18. A method for latency optimisation in a receiver for digital data, the method comprising:
writing received data into a ring buffer at a current write position;
reading data from the ring buffer at a current read position;
reading data from the ring buffer at a future read position; and
controlling at least one of a write pointer indicating the current write position and a read pointer indicating the current read position based on the data read from the ring buffer at the future read position, in a response to a detection of a special data indicator, wherein the controlling step comprises comparing a special character read from the future read position of a first lane with a special character read from the future read position of a further lane for determining whether the special characters are time aligned across the lanes.

19. The method of claim 18, wherein the future read position corresponds to a future of at least one clock cycle.

20. The method of claim 18, wherein the future read position corresponds to a future of at least two clock cycles.

21. The method of claim 18, further comprising generating a volatile read pointer corresponding to the future read position to enable reading therefrom.

22. The method of claim 18, wherein the data read from the ring buffer at the future read position comprises a special character and the controlling step is performed in dependence upon the identity of the special character.

23. The method of claim 18, further comprising asynchronously detecting the positions of the write pointer and read pointer.

24. The method of claim 23, wherein the controlling step comprises controlling the relative spacing of the write pointer and the read pointer.

25. The method of claim 18, further comprising regenerating a clock signal used in transmission data received at the receiver.

26. The method of claim 25, further comprising controlling the position of the write pointer based on the regenerated clock signal.

27. The method of claim 26, further comprising:
generating a local clock signal within the receiver;
controlling the position of the read pointer based on the local clock signal; and
synchronising the regenerated clock signal to the local clock signal.

28. The method of claim 18, wherein the receiver is arranged to receive data over a plurality of lanes, the receiver comprising a ring buffer for each lane.

29. The method of claim 28, wherein the controlling step comprises controlling at least one pointer for the ring buffer for each lane.

30. The method of claim 18, wherein the special data indicator comprises a data bit of said received data.

31. The method of claim 18, wherein the special data indicator indicates a special data symbol.

32. The method of claim 31, wherein the special data symbol is a skip symbol.

33. A method for latency optimisation in a receiver for digital data, the method comprising:
a step of writing received data into ring buffer means at a current write position;
a step of reading data from the ring buffer means at a current read position;
a step of reading data from the ring buffer means at a future read position; and
a step of controlling at least one of a write pointer indicating the current write position and a read pointer indicating the current read position based on the data read from the ring buffer at the future read position, in a response to a detection of a special data indicator, wherein the controlling step comprises comparing a special character read from the future read position of a first lane with a special character read from the future read position of a further lane for determining whether the special characters are time aligned across the lanes.

34. A receiver for digital data, comprising:
a ring buffer operable to store received data;
a write pointer controller for the ring buffer operable to control the writing of received data into the buffer based on a clock signal regenerated from data received at the receiver;
a read pointer controller for the ring buffer operable to control the reading of data from the buffer based on a local clock signal;
a clock synchroniser operable to synchronise a signal representative of the regenerated clock signal to a signal representative of the local clock signal; and
a pointer adjustment controller operable to control at least one of the write pointer controller and the read pointer controller based on an output of the clock sychroniser, wherein the clock synchroniser is operable to synchronise a write pointer generated by the write pointer controller to the local clock signal and to produce an output comprising a synchronised write pointer.

35. The receiver of claim 34, wherein the pointer adjustment controller is operable to control the at least one of the write pointer controller and the read pointer controller based on the synchronised write pointer.

36. The receiver of claim 34, wherein the clock synchroniser is operable to synchronise the write pointer to the local clock signal by clocking the write pointer with a modified regenerated clock signal stabilised by the local clock signal.

37. The receiver of claim 34, wherein the pointer synchronisation controller is further operable to control at least one of the read pointer controller and the write pointer controller using forward looking operable to foresee a data location within the ring buffer corresponding to a future read location of the ring buffer.

38. The receiver of claim 34, arranged to receive data over a plurality of lanes, the receiver comprising a ring buffer and pointer controllers for each lane.

39. The receiver of claim 38, wherein a single pointer adjustment controller is operable to control at least one pointer controller for each lane.

40. A receiver for digital data, comprising:
buffer means arranged as a ring buffer for storing data;
write pointer control means for controlling the writing of received data into the buffer means based on a clock signal regenerated from data received at the receiver;
read pointer control means for controlling the reading of data from the buffer means based on a local clock signal;
clock synchroniser means for synchronising a signal representative of the regenerated clock signal to a signal representative of the local clock signal; and
pointer adjustment control means for controlling at least one of the write pointer control means and the read pointer control means based on an output of the clock synchroniser means,
wherein the clock synchroniser is configured to synchronise the write pointer to the local clock signal to produce a synchronised write pointer.

41. A multi-lane receiver for digital data, comprising:
a buffer for each lane operable to store received data;
a write pointer controller for each buffer operable to control the writing of received data into the buffer based on a clock signal regenerated from data received at the receiver;
a read pointer controller for each buffer operable to control the reading of data from the buffer based on a local clock signal;
a clock synchroniser for each buffer operable to synchronise a signal representative of the regenerated clock signal to a signal representative of the local clock signal; and
a pointer adjustment controller operable to control at least one of the write pointer controller and the read pointer controller based on an output of the clock synchroniser,
wherein the clock synchroniser is configured to synchronise the write pointer to the local clock signal to produce a synchronised write pointer.

42. A method for latency optimisation in a receiver for digital data, the method comprising:
   writing received data into a buffer at a current write position determined on the basis of a clock signal regenerated from data received at the receiver;
   reading data from the buffer at a current read position determined on the basis of a local clock signal;
   synchronising a signal representative of the regenerated clock signal to a signal representative of the local clock signal; and
   controlling at least one of a write pointer indicating the current write position and a read pointer indicating the current read position based on a result of the synchronising step,
   wherein the synchroniser comprises synchronising the write pointer to the local clock signal to produce a synchronised write pointer.

43. The method of claim 42, wherein the controlling comprises controlling at least one of the write pointer and the read pointer based on the synchronised write pointer.

44. The method of 42, wherein the synchronising comprises synchronising the write pointer to the local clock signal by clocking the write pointer with a modified regenerated clock signal stabilised by the local clock signal.

45. The method of claim 42, further comprising:
   reading data from the buffer at a future read position;
   wherein the controlling step comprises controlling at least one of the read pointer and the write pointer based on the data read from the buffer at the future read position.

46. The method of claim 42, wherein the receiver is arranged to receive data over a plurality of lanes, the receiver comprising a buffer for each lane.

47. The method of claim 46, wherein the controlling step comprises controlling at least one of the write pointer and the read pointer for the buffer for each lane.

48. A method for latency optimisation in a multi-lane receiver for digital data, the method comprising:
   writing received data into a ring buffer for each lane at a current write position determined on the basis of a clock signal regenerated from data received at the receiver for each lane;
   reading data from the buffer for each lane at a current read position determined on the basis of a local clock signal;
   synchronising a signal representative of the regenerated clock signal for each lane to a signal representative of the local clock signal; and
   controlling at least one of a write pointer indicating the current write position and a read pointer indicating the current read position based on a result of the synchronising step,
   wherein the synchronising comprises synchronising the write pointer to the local clock signal to produce a synchronised write pointer.

49. A multi-lane receiver for digital data, comprising a controller operable to control the position of a read pointer for a ring buffer for each lane in response to one or more of:
   a detected non-alignment of data received by separate lanes of the receiver;
   a detected phase offset between a clock signal recovered from data received by a lane and a clock signal used to control the read pointer position; and
   a detected phase drift between a clock signal recovered from data received by a lane and a clock signal used to control the read pointer position;
   wherein the controller is operable to detect a phase drift between a clock signal recovered from data received by a lane and a clock signal used to control the read pointer position from an output of a clock synchroniser operable to synchronise the write pointer to the clock used to control the read pointer position and to produce an output indicative of the phase difference therebetween, and
   wherein the controller is operable to detect a write pointer position and a read pointer position for the ring buffer for each lane and to compare data read from one read buffer at the read pointer position and a read pointer future position with data read from a further ring buffer at the read pointer position and a read pointer future position to determine an alignment condition of data received over one lane relative to data received over a further lane.

50. A computer-readable medium carrying processor implementable instructions for causing a programmable processing apparatus to become configured as the receiver of claim 1.

51. A computer-readable medium carrying processor implementable instructions for causing a programmable processing apparatus to become configured as the receiver of claim 34.

52. A computer-readable medium carrying processor implementable instructions for causing a programmable processing apparatus to become configured as the multi-lane receiver of claim 49.

53. A signal conveying processor implementable instructions for causing a programmable processing apparatus to become configured as the receiver of claim 1.

54. A signal conveying processor implementable instructions for causing a programmable processing apparatus to become configured as the receiver of claim 34.

55. A signal conveying processor implementable instructions for causing a programmable processing apparatus to become configured as the receiver of claim 49.

56. A computer readable medium carrying processor implementable instructions for causing a programmable processing apparatus carry out a method for latency optimisation in a receiver for digital data, the method comprising:
   writing received data into a ring buffer at a current write position;
   reading data from the ring buffer at a current read position;
   reading data from the ring buffer at a future read position; and
   controlling at least one of a write pointer indicating the current write position and a read pointer indicating the current read position based on the data read from the ring buffer at the future read position, in a response to a detection of a special data indicator, wherein detecting a phase drift between a clock signal recovered from data received by a lane and a clock signal used to control the read pointer position from an output of a clock synchroniser synchronises the write pointer to the clock used to control the read pointer position and to produce an output indicative of the phase difference therebetween.

57. A computer readable medium carrying processor implementable instructions for causing a programmable processing apparatus to carry out a method for latency optimisation in a receiver for digital data, the method comprising:

writing received data into a buffer at a current write position determined on the basis of a clock signal regenerated from data received at the receiver;

reading data from the buffer at a current read position determined on the basis of a local clock signal;

synchronising a signal representative of the regenerated clock signal to a signal representative of the local clock signal; and controlling at least one of a write pointer indicating the current write position and a read pointer indicating the current read position based on a result of the synchronising step, wherein the synchronising comprises synchronising the write pointer to the local clock signal to produce a synchronised write pointer.

* * * * *

UNITED STATES PATENT AND TRADEMARK OFFICE
CERTIFICATE OF CORRECTION

PATENT NO. : 7,242,736 B2  Page 1 of 1
APPLICATION NO. : 10/438898
DATED : July 10, 2007
INVENTOR(S) : Schanke et al.

It is certified that error appears in the above-identified patent and that said Letters Patent is hereby corrected as shown below:

In claim 42 (at column 25, line 16), please delete the word, "synchroniser" and replace with the word --synchronising--.

Signed and Sealed this

Fourth Day of September, 2007

JON W. DUDAS
*Director of the United States Patent and Trademark Office*